US012607396B2

(12) United States Patent
 Park et al.

(10) Patent No.: US 12,607,396 B2
(45) Date of Patent: Apr. 21, 2026

(54) REFRIGERATOR AND CONTROL METHOD THEREOF

(71) Applicant: Samsung Electronics Co., Ltd., Suwon-si (KR)

(72) Inventors: Youna Park, Suwon-si (KR); Danim Kang, Suwon-si (KR); Youngsun Shin, Suwon-si (KR); Jiyoon Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 18/340,425

(22) Filed: Jun. 23, 2023

(65) Prior Publication Data

US 2023/0332825 A1 Oct. 19, 2023

Related U.S. Application Data

(63) Continuation of application No. PCT/KR2021/016779, filed on Nov. 16, 2021.

(30) Foreign Application Priority Data

Jan. 8, 2021 (KR) ........................ 10-2021-0002797

(51) Int. Cl.
 *F25D 23/02* (2006.01)
 *G06V 20/68* (2022.01)
(52) U.S. Cl.
 CPC .......... *F25D 23/028* (2013.01); *G06V 20/68* (2022.01); *F25D 2400/36* (2013.01); *F25D 2700/06* (2013.01)
(58) Field of Classification Search
 CPC .............. F25D 23/028; F25D 2400/36; F25D 2700/06; F25D 2400/361; F25D 2500/06;
 (Continued)

(56) References Cited

U.S. PATENT DOCUMENTS 6,442,952 B2 9/2002 Roh et al.
9,903,634 B2 2/2018 Son et al.
 (Continued)

FOREIGN PATENT DOCUMENTS

CN 104811802 A 7/2015
CN 105509394 B 9/2018
 (Continued)

OTHER PUBLICATIONS

Extended European Search Report dated Apr. 8, 2024, issued in European Patent Application No. 21917869.6.
 (Continued)

*Primary Examiner* — Michael E Teitelbaum
(74) *Attorney, Agent, or Firm* — Jefferson IP Law, LLP

(57) ABSTRACT

A refrigerator is provided. The refrigerator includes a storage room, a camera having a field of view facing the storage room, a display, a distance sensor, and a control unit. The control unit may obtain image data of the storage room from the camera, identify food stored in the storage room on the basis of the image data, obtain a menu based on information regarding the identified food, control the display to display a first window frame including a notification regarding the menu, in response to a distance to a user being greater than or equal to a predetermined reference distance based on an output from the distance sensor, and control the display to display a second window frame including a notification regarding the menu, in response to the distance to the user being less than the reference distance on the basis of the output from the distance sensor.

14 Claims, 23 Drawing Sheets

(58) Field of Classification Search
CPC .... F25D 2700/04; F25D 29/005; F25D 29/00;
G06V 20/68; G06Q 10/087; G06Q 10/10;
G06Q 30/0623; G06Q 30/0631; G06Q
30/0633; G06Q 30/0641; G06Q 50/12;
G06Q 50/163; G06Q 50/10; H04L
67/125; H04N 23/57
See application file for complete search history.

(56) References Cited

U.S. PATENT DOCUMENTS

| | | | |
|---|---|---|---|
| 10,161,674 B2 | 12/2018 | Takaki et al. | |
| 10,365,033 B2 | 7/2019 | Furuta et al. | |
| 10,467,584 B2 | 11/2019 | Lee et al. | |
| 10,563,902 B2 | 2/2020 | Kim et al. | |
| 10,724,792 B2 | 7/2020 | Oh | |
| 10,823,496 B2 | 11/2020 | Hwang et al. | |
| 10,969,162 B2 | 4/2021 | Kim et al. | |
| 11,353,259 B2 | 6/2022 | Jeong et al. | |
| 2009/0240520 A1* | 9/2009 | Takano | G16H 15/00 |
| | | | 709/204 |
| 2010/0070089 A1 | 3/2010 | Harrod et al. | |
| 2014/0193783 A1 | 7/2014 | Jeong et al. | |
| 2017/0186079 A1 | 6/2017 | Kim et al. | |
| 2018/0335252 A1 | 11/2018 | Oh | |
| 2019/0340674 A1 | 11/2019 | Vaananen | |

FOREIGN PATENT DOCUMENTS

| | | | |
|---|---|---|---|
| CN | 110875090 | A | 3/2020 |
| CN | 111292828 | A | 6/2020 |
| CN | 110637204 | B | 3/2022 |
| JP | 2002-22329 | A | 1/2002 |
| JP | 2017-133803 | A | 8/2017 |
| JP | 6748601 | B2 | 9/2020 |
| KR | 10-2002-0030221 | A | 4/2002 |
| KR | 10-0673435 | B1 | 1/2007 |
| KR | 10-0823496 | B1 | 4/2008 |
| KR | 10-2009-0076124 | A | 7/2009 |
| KR | 10-2014-0026917 | A | 3/2014 |
| KR | 10-2014-0093045 | A | 7/2014 |
| KR | 10-2016-0082308 | A | 7/2016 |
| KR | 10-1813030 | B1 | 12/2017 |
| KR | 10-2019-0084913 | A | 7/2019 |
| KR | 10-2014137 | B1 | 8/2019 |
| KR | 10-2020-0032625 | A | 3/2020 |
| KR | 10-2020-0099689 | A | 8/2020 |
| WO | 2020/198642 | A1 | 10/2020 |

OTHER PUBLICATIONS

International Search Report dated Mar. 8, 2022, issued in International Patent Application No. PCT/KR2021/016779.
European Notice of Allowance dated Oct. 28, 2025, issued in European Application No. 21917869.6.

* cited by examiner

121b(120)

430

130

160

REFRIGERATOR AND CONTROL METHOD THEREOF

CROSS-REFERENCE TO RELATED APPLICATION(S)

This application is a continuation application, claiming priority under § 365(c), of an International application No. PCT/KR2021/016779, filed on Nov. 16, 2021, which is based on and claims the benefit of a Korean patent application number 10-2021-0002797, filed on Jan. 8, 2021, in the Korean Intellectual Property Office, the disclosure of which is incorporated by reference herein in its entirety.

BACKGROUND

1. Field

The disclosure relates to a refrigerator and a control method thereof. More particularly, the disclosure relates to a refrigerator, capable of communicating with a server device and home appliances, and a control method thereof.

2. Description of Related Art

Generally, a refrigerator is an appliance for storing objects to be stored, such as foods and beverages, for a long period of time without spoiling and typically includes a refrigerator compartment configured to refrigerate and store an object to be stored and a freezer compartment configured to freeze and store an object to be stored.

A refrigerator repeatedly performs a cooling cycle including compression, condensation, expansion, and evaporation of a refrigerant to maintain temperatures of storage compartments at set target temperatures. Based on a target temperature of each storage compartment (a refrigerator compartment and/or a freezer compartment), the refrigerator supplies air, which is cooled by an evaporator provided to correspond to each storage compartment, into each storage compartment to allow the temperature of each storage compartment to be maintained at the target temperature.

Nowadays, a refrigerator sometimes includes a display configured to display temperatures of storage compartments and an operation mode of the refrigerator. The display provides a graphical user interface to a user, allows the user to easily obtain refrigerator-related information and/or food-related information using the graphical user interface and a touch panel, and allows the user to intuitively input a control command.

In particular, the refrigerator may, in response to an input from a user that is made through a display, display information on foods stored in storage compartments through the display and manage information on each food.

Further, the refrigerator may display information for buying goods, recipes for cooking food, and the like through the display.

The above information is presented as background information only to assist with an understanding of the disclosure. No determination has been made, and no assertion is made, as to whether any of the above might be applicable as prior art with regard to the disclosure

SUMMARY

Aspects of the disclosure are to address at least the above-mentioned problems and/or disadvantages and to provide at least the advantages described below. Accordingly, an aspect of the disclosure is to provide a refrigerator and a control method thereof for providing a meal plan and/or a recipe therefor to a user based on foods stored in a storage compartment and/or the user's purchase record and/or the user's meal record.

Another aspect of the disclosure is to provide a refrigerator and a control method thereof for recommending buying of an item to a user based on foods stored in a storage compartment and/or the user's purchase record and/or the user's meal record.

Another aspect of the disclosure is to provide a refrigerator and a control method thereof for, in response to different positions of a user, providing information on a meal plan and/or an item through user interface (UI) frames of different sizes on a display.

Another aspect of the disclosure is to provide a refrigerator and a control method thereof for, in response to different positions of a user, providing information on a meal plan and/or an item through different electronic devices.

Additional aspects will be set forth in part in the description which follows and, in part, will be apparent from the description, or may be learned by practice of the presented embodiments.

In accordance with an aspect of the disclosure, a refrigerator is provided. The refrigerator includes a storage compartment, a camera having a field of view facing the storage compartment, a display, a range sensor, and a controller. The controller may obtain image data of the storage compartment from the camera, identify foods stored in the storage compartment based on the image data, obtain a meal plan based on information on the identified foods, control the display to display a first window frame including a notification regarding the meal plan, in response to a distance to a user being a predetermined reference distance or more based on an output of the range sensor, and control the display to display a second window frame including a notification regarding the meal plan, in response to the distance to the user being less than the reference distance based on the output of the range sensor. The size of the second window frame may be different from the size of the first window frame.

In accordance with another aspect of the disclosure, a control method of a refrigerator including a storage compartment and a camera having a field of view facing the storage compartment is provided. The control method includes obtaining image data of the storage compartment from the camera, identifying foods stored in the storage compartment based on the image data, obtaining a meal plan based on information on the identified foods, displaying a first window frame including a notification regarding the meal plan, in response to a distance to a user being a predetermined reference distance or more based on an output of a range sensor, and displaying a second window frame including a notification regarding the meal plan, in response to the distance to the user being less than the reference distance based on the output of the range sensor. The size of the second window frame may be different from the size of the first window frame.

In accordance with another aspect of the disclosure, a refrigerator is provided. The refrigerator includes a storage compartment, a camera having a field of view facing the storage compartment, a display, and a controller. The controller may obtain image data of the storage compartment from the camera, identify foods stored in the storage compartment based on the image data, obtain a meal plan based on information on the identified foods, a recipe for the meal plan, and a recommendation of items to buy for the meal plan, and simultaneously display the meal plan, the recipe for the meal plan, and the recommendation of items to buy for the meal plan on a single screen of the display.

According to one aspect of the disclosure, it is possible to provide a refrigerator and a control method thereof for providing a meal plan and/or a recipe therefor to a user based on foods stored in a storage compartment and/or the user's purchase record and/or the user's meal record.

According to one aspect of the disclosure, it is possible to provide a refrigerator and a control method thereof for recommending buying of an item to a user based on foods stored in a storage compartment and/or the user's purchase record and/or the user's meal record.

According to one aspect of the disclosure, it is possible to provide a refrigerator and a control method thereof for, in response to different positions of a user, providing information on a meal plan and/or an item through user interface (UI) frames of different sizes on a display.

According to one aspect of the disclosure, it is possible to provide a refrigerator and a control method thereof for, in response to different positions of a user, providing information on a meal plan and/or an item through different electronic devices.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a certain portion is described as being "connected" to another portion, this includes a case in which the certain portion is indirectly connected to the other portion as well as a case in which the certain portion is directly connected to the other portion, and the indirect connection includes connection through a wireless network.

Also, when a certain portion is described as "including" a certain element, unless particularly described otherwise, this denotes that the certain portion may further include other elements instead of excluding other elements.

Throughout the specification, when a certain member is described as being positioned "on" another member, this includes a case in which still another member is present between the two members as well as a case in which the certain member is in contact with the other member.

Terms such as first and second are used to distinguish one element from another element, and elements are not limited by such terms.

Identification numerals for different operations are used for convenience of description. The identification numerals are not intended to describe the order of the operations, and unless the context clearly indicates a specific order, the operations may be carried out in an order different from the stated order.

Hereinafter, operation principles and embodiments of the disclosure will be described with reference to the accompanying drawings.

Figure 1:
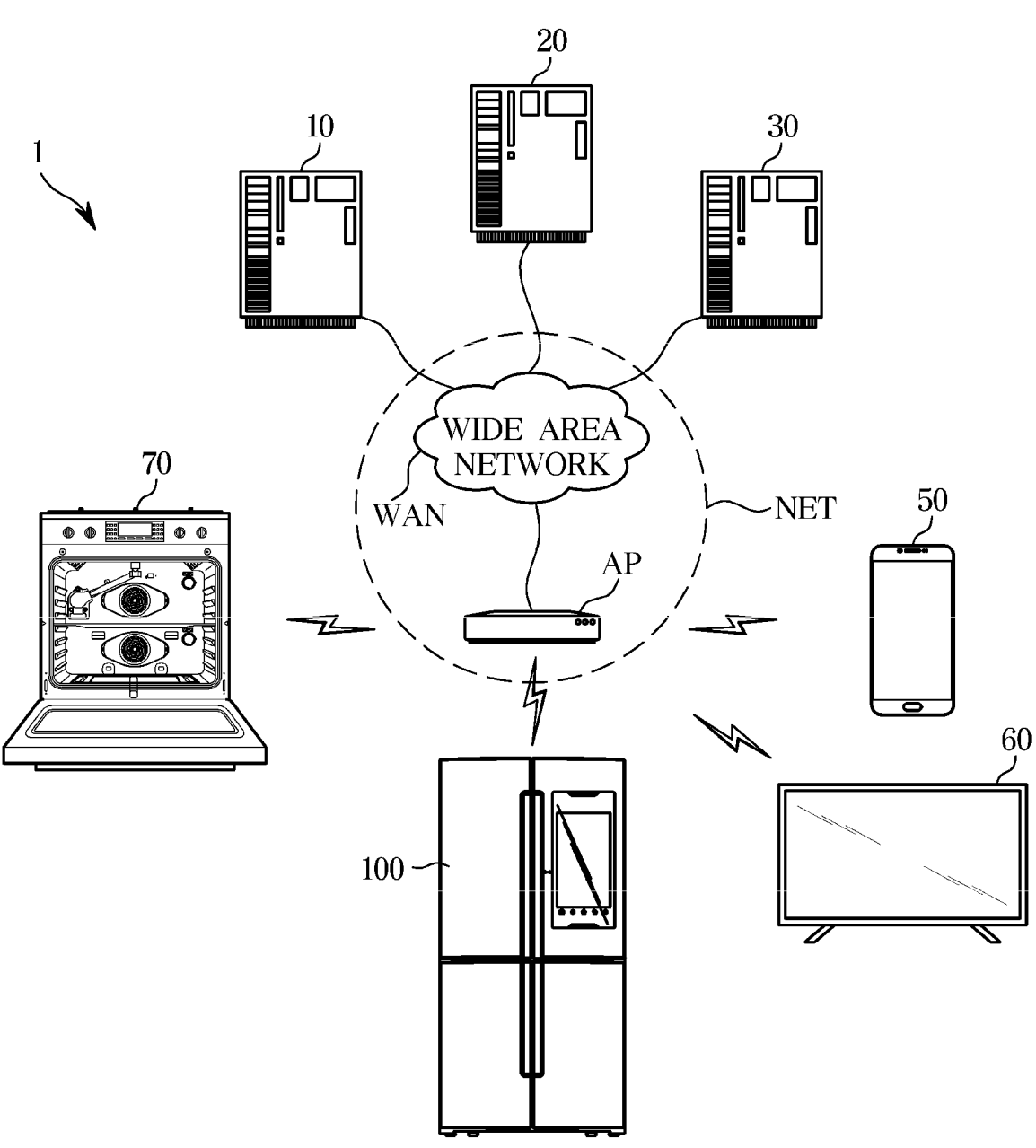
FIG. 1 illustrates a food management system according to an embodiment of the disclosure.

FIG. 1 illustrates a food management system according to an embodiment of the disclosure.

Referring to FIG. 1, a food management system 1 may include a refrigerator 100 configured to store food, a first server device 10 configured to manage user information of a user of the refrigerator 100, a second server device 20 configured to provide a meal plan and a recipe therefor to the user, a third server device 30 configured to provide a buying interface for buying of an item, a user device 50 configured to be carried by the user, a display device 60 configured to provide image information to the user, and a cooking device 70 configured to cook food.

The devices 10, 20, 30, 50, 60, 70, and 100 included in the food management system 1 may be connected through a communication network NET. Here, the communication network NET may include both a wired communication network and a wireless communication network. The wired communication network may include a communication network such as a cable network or a telephone network, and the wireless communication network may include a communication network configured to transmit and receive a signal through radio waves. The wired communication network and the wireless communication network may be connected to each other. For example, the wired communication network may include a wide area network (WAN) such as the Internet, and the wireless communication network may include an access point (AP) connected to the WAN.

The refrigerator 100 may refrigerate and store food or freeze and store food. For example, the refrigerator 100 may include a storage compartment configured to accommodate food and a cooling device configured to cool the storage compartment. In order to prevent the foods stored in the storage compartment from spoiling, the refrigerator 100 may use the cooling device to supply cooled air to the storage compartment.

The refrigerator 100 may, in response to a request from a user, provide information related to the foods stored in the storage compartment (for example, a list of foods and/or a best-before date of each food) to the user. For example, the refrigerator 100 may capture an image of the storage compartment in which food is stored and may obtain an image of the inside of the storage compartment. Based on the captured image of the inside of the storage compartment, the refrigerator 100 may obtain information related to the foods stored in the storage compartment. Also, the refrigerator 100 may display the food-related information or send the food-related information to the display device 60 and/or the user device 50.

The server devices 10, 20, and 30 may process data from another device through the communication network NET and may store the processed data or send the processed data to another device. For example, the server devices 10, 20, and 30 may include a communication unit configured to communicate with another device, a processing unit configured to process data, and a storage medium configured to store the processed data. The server devices 10, 20, and 30 may be referred to by various names such as servers, clients, workstations, personal computers, clouds, data drives, and data stations.

The first server device 10 may receive user information of a user, information on foods preferred by the user, and refrigerator connection information from the refrigerator 100 through the communication network NET and may save and manage the received pieces of information. For example, the first server device 10 may save/manage user identification information (for example, a name, a nationality, an address, a contact number, and the like) and user authentication information (for example, an ID, a password, biometric information (a fingerprint or an iris), and the like). The first server device 10 may save/manage information on a device connected to the refrigerator 100 (for example, devices linked by an input from a user, devices connected to an AP to which the refrigerator is connected, or the like). Also, the first server device 10 may save/manage information on foods preferred by the user (for example, preferred foods, avoided foods, preferred cooking methods, and the like).

Also, the first server device 10 may, in response to a user's request and/or agreement to provide information, provide the user information of a user and/or the connection information of the refrigerator 100 and/or the information on foods preferred by the user to the second server device 20 and/or the third server device 30.

The second server device 20 may provide a meal plan for intake of food and/or a recipe for cooking food to a user.

For example, the second server device 20 may receive the user information of a user and/or the connection information of the refrigerator 100 and/or the information on foods preferred by the user from the first server device 10. The second server device 20 may receive food-related information of foods stored in the refrigerator 100 from the refrigerator 100 or receive a purchase record of the user from the third server device 30. Also, the second server device 20 may, based on the information received from the first server device 10, select a meal plan for intake of food by a user and/or a recipe for cooking the food and send the selected meal plan and/or recipe therefor to the refrigerator 100.

Also, the second server device 20 may, in response to a user's request and/or agreement to provide information, provide the selected meal plan and/or recipe therefor to the third server device 30.

The third server device 30 may provide a buying interface for buying of an item to the user.

For example, to allow the buying interface including information on buying of an item (for example, an item image, an item price, and the like) to be displayed, the third server device 30 may send the information on buying of an item to the refrigerator 100. The third server device 30 may, in response to an input from the user, execute buying of an item through the buying interface.

The third server device 30 may receive the food-related information of foods stored in the refrigerator 100 from the refrigerator 100 or receive the user's meal plan and/or recipe therefor from the second server device 20. The third server device 30 may, based on the food-related information and/or the meal plan and/or recipe therefor, send a notification recommending buying of an item to the refrigerator 100.

Also, the third server device 30 may, in response to a user's request and/or agreement to provide information, provide the user's purchase record to the second server device 20.

The user device 50 may process data from another device through the communication network NET and may display the processed data to the user. In particular, the user device 50 may be carried by the user or placed in the user's home, office, or the like, and the user may easily reach the user device 50. The user device 50 may be referred to by various names such as a workstation, a personal computer, a terminal, a portable telephone, a smartphone, a handheld device, and a wearable device.

The user device 50 may receive information related to foods stored in the refrigerator 100 from the refrigerator 100 and may display the information related to the foods stored in the refrigerator 100. The user device 50 may receive a meal plan and/or a recipe therefor from the second server device 20 and may display the meal plan and/or recipe therefor. Also, the user device 50 may receive a buying interface for buying of an item from the third server device 30 and may display the buying interface.

The display device 60 may process an image signal received from an outside and visually display the processed image. Examples of the display device 60 may include a television (TV), a monitor, a portable multimedia device, a portable communication device, a large format display (LFD), and the like.

The display device 60 may receive information related to foods stored in the refrigerator 100 from the refrigerator 100 and may display the information related to the foods stored in the refrigerator 100. The display device 60 may receive a meal plan and/or a recipe therefor from the second server device 20 and may display the meal plan and/or recipe therefor. Also, the display device 60 may receive a buying interface for buying of an item from the third server device 30 and may display the buying interface.

The cooking device 70 may, in response to an input from a user, heat/cook an object to be cooked. For example, the cooking device 70 may include a chamber configured to accommodate an object to be cooked and may preheat an inside of the chamber to promptly heat/cook the object to be cooked.

The cooking device 70 may be connected to the same AP as the refrigerator 100 and may exchange messages and data with the refrigerator 100 through the AP or any of the server devices. An example of the cooking device 70 may include any electrically-controllable cooking device such as a gas oven, an electric oven, a microwave oven, a toaster, or a rice cooker.

As described above, the food management system 1 may provide a meal plan and/or a recipe therefor to the user based on the user information of the user and/or the connection information of the refrigerator 100 and/or the information on foods preferred by the user. Also, the food management system 1 may recommend buying of an item based on the user's purchase record and/or the meal plan and/or recipe therefor.

Hereinafter, configurations and operations of the refrigerator 100 included in the food management system 1 will be described.

Figure 2:
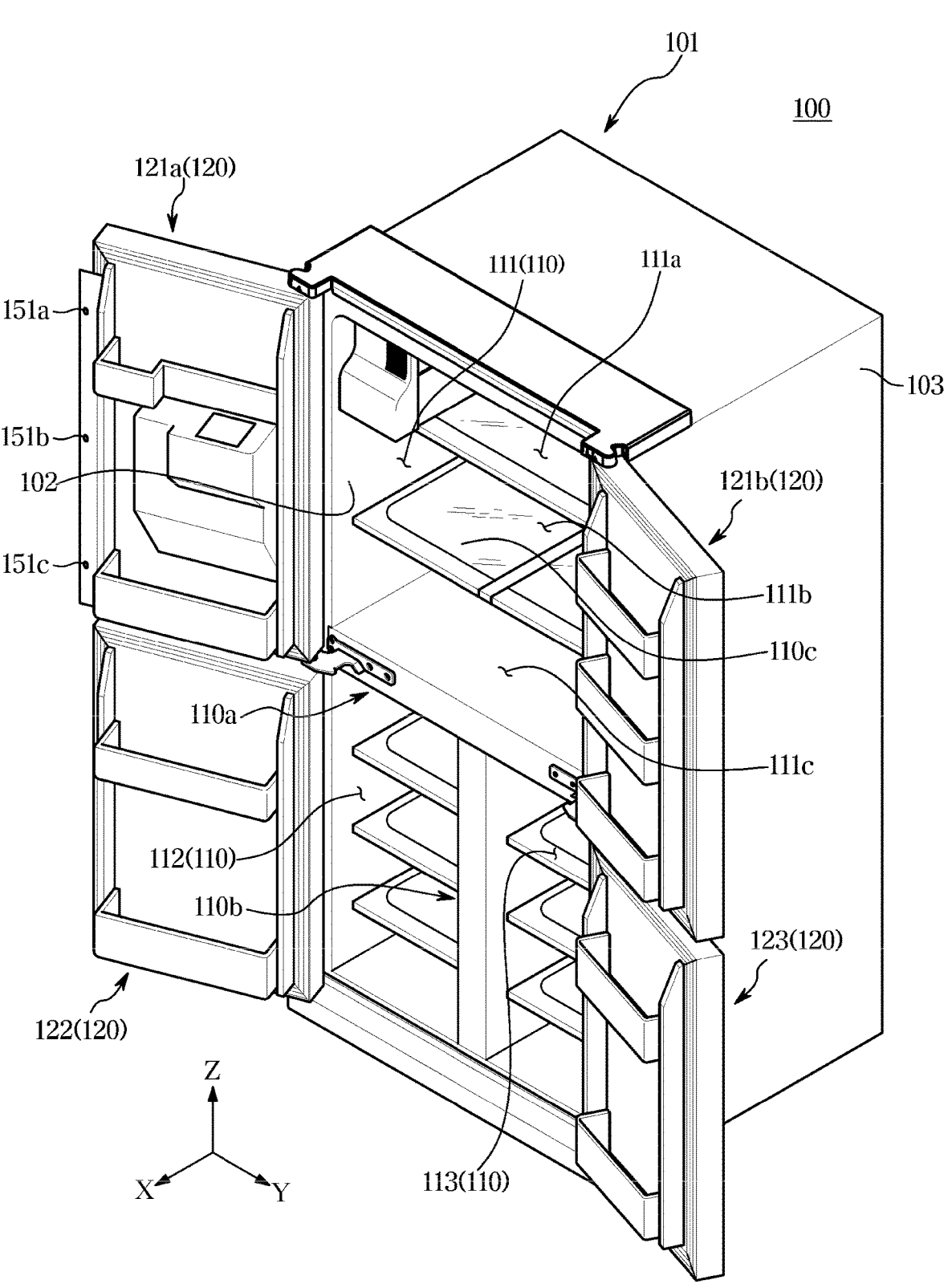
FIG. 2 illustrates an exterior of a refrigerator according to an embodiment of the disclosure.

FIG. 2 illustrates an exterior of a refrigerator according to an embodiment of the disclosure.

Figure 3:
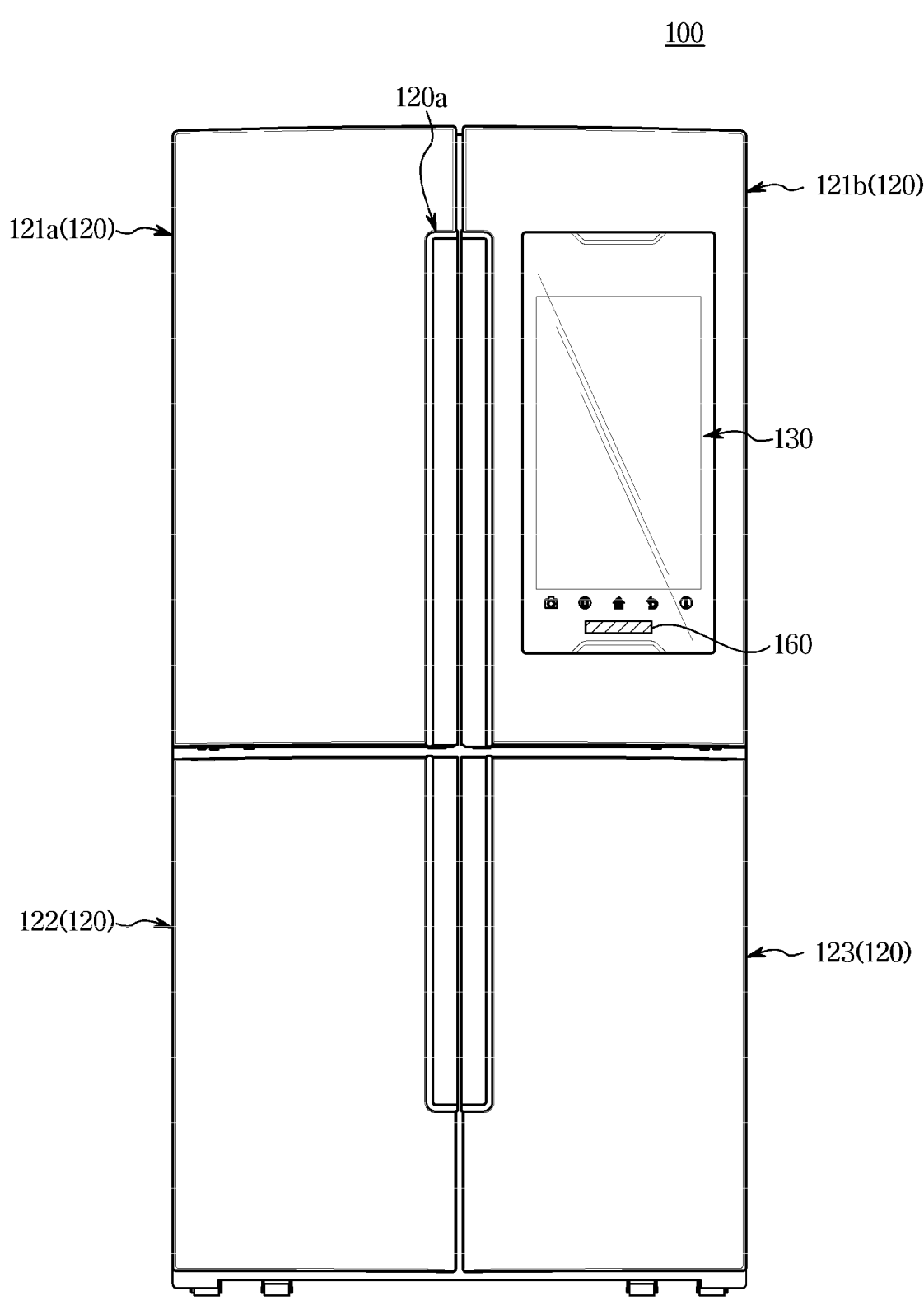
FIG. 3 illustrates a front surface of a refrigerator according to an embodiment of the disclosure.

FIG. 3 illustrates a front surface of a refrigerator according to an embodiment of the disclosure.

Figure 4:
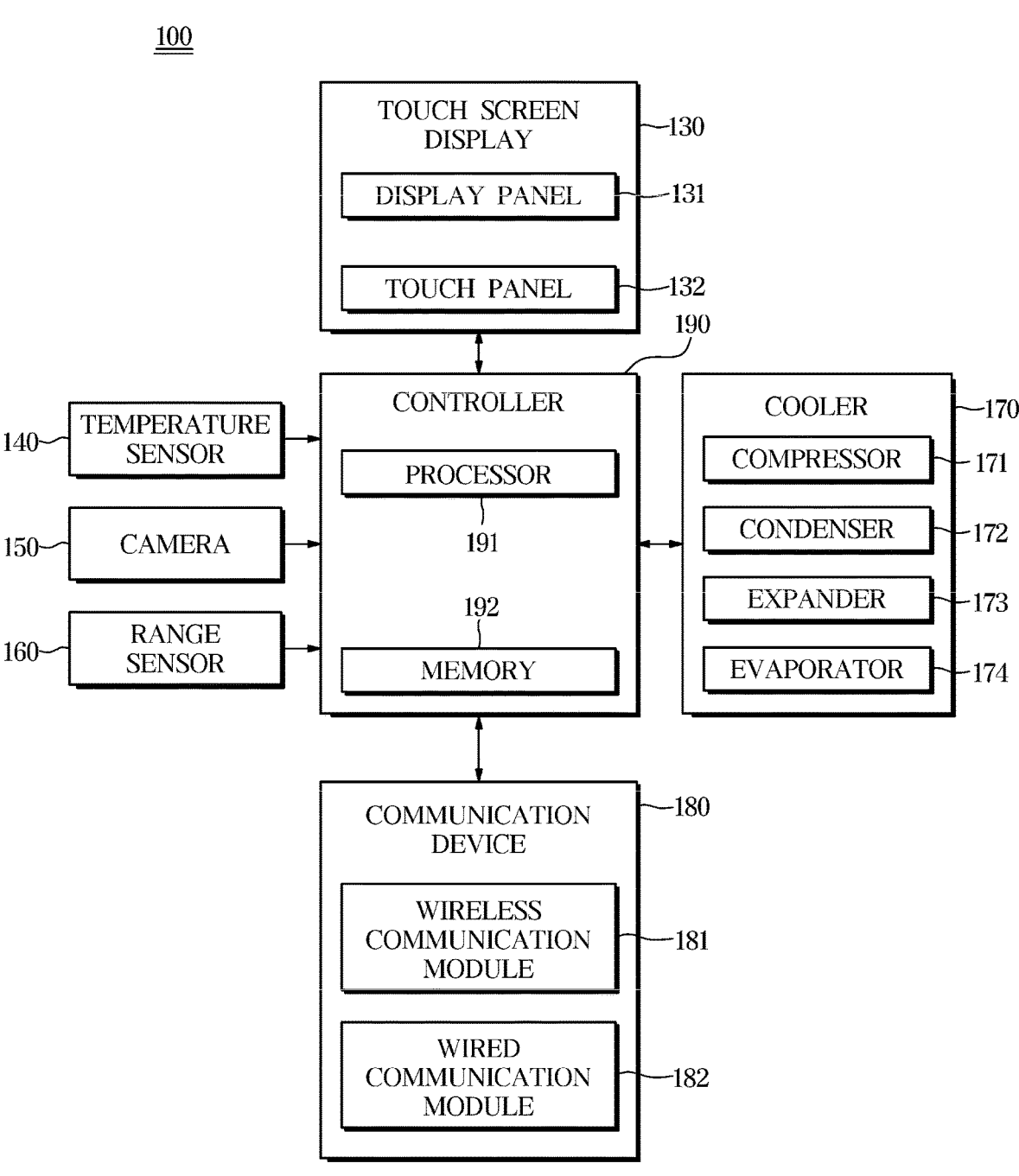
FIG. 4 illustrates a configuration of a refrigerator according to an embodiment of the disclosure.

FIG. 4 illustrates a configuration of a refrigerator according to an embodiment of the disclosure.

Figure 5:
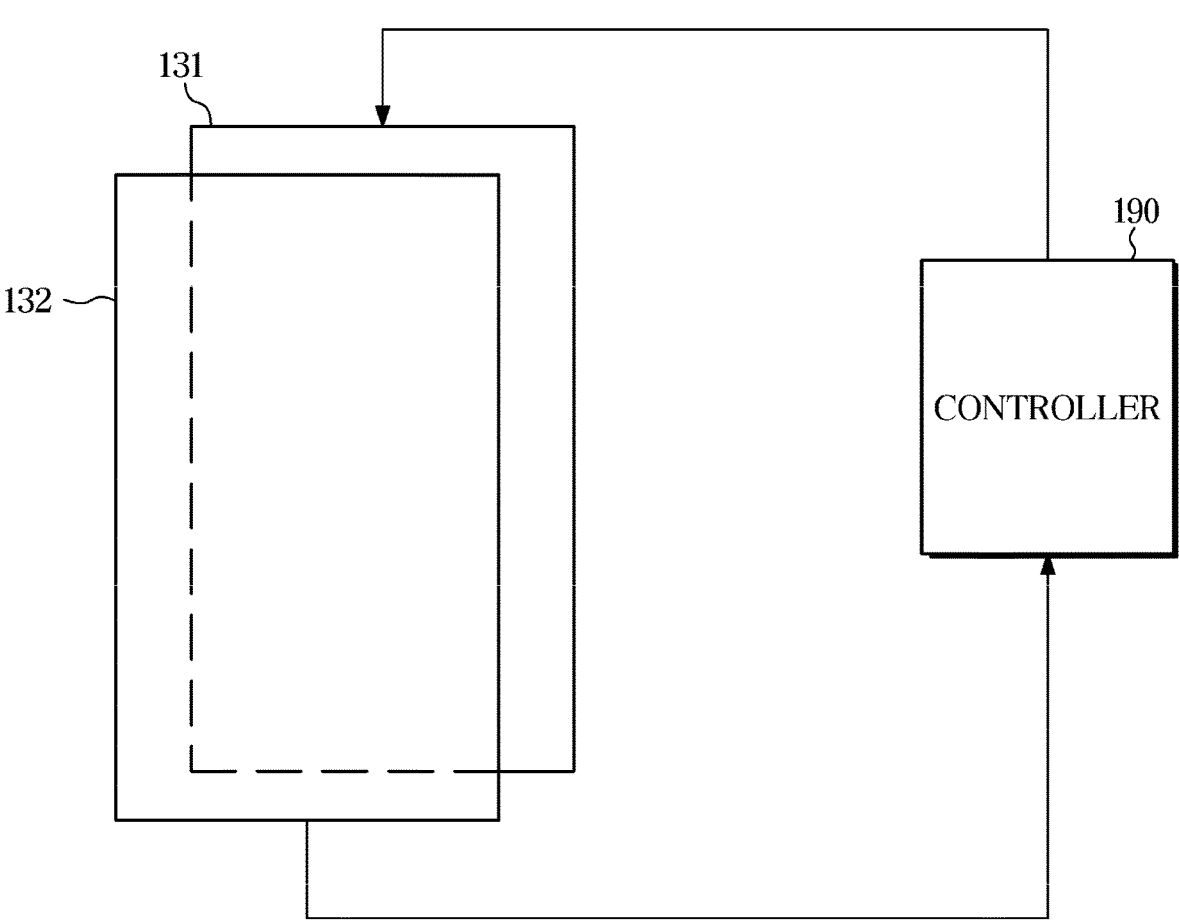
FIG. 5 illustrates a touchscreen display included in a refrigerator according to an embodiment of the disclosure.

FIG. 5 illustrates a touchscreen display included in a refrigerator according to an embodiment of the disclosure.

Referring to FIGS. 2, 3, 4, and 5, the refrigerator 100 may include a body 101 having an open front, a storage compartment 110 formed inside the body 101 and configured to store foods in a refrigerated state and/or a frozen state, and a door 120 configured to open and close the open front of the body 101.

The body 101 may form an exterior of the refrigerator 100. The body 101 may include a cavity 102 configured to form the storage compartment 110 and a cabinet 103 coupled to an outside of the cavity 102 to form the exterior. An insulating material (not illustrated) configured to prevent a leak of cold air from the storage compartment 110 may be filled between the cavity 102 and the cabinet 103 of the body 101.

The storage compartment 110 may be divided into a plurality of compartments by a horizontal partition 110a and a vertical partition 110b. For example, as illustrated in FIG. 2, the storage compartment 110 may be divided into an upper storage compartment 111, a lower first storage compartment 112, and a lower second storage compartment 113.

A shelf 110c on which food can be placed may be provided in the storage compartment 110. A storage space inside the storage compartment 110 may be divided by the shelf 110c. For example, the upper storage compartment 111 may be divided into a first storage space 111a, a second storage space 111b, and a third storage space 111c.

The storage compartment 110 may be opened and closed by the door 120. For example, as illustrated in FIG. 2, the upper storage compartment 111 may be opened and closed by an upper first door 121a and an upper second door 121b, the lower first storage compartment 112 may be opened and closed by a lower first door 122, and the lower second storage compartment 113 may be opened and closed by a lower second door 123.

A handle 120a may be provided at the door 120 to allow the door 120 to be easily opened and closed. The handle 120a may be longitudinally formed in the up-down direction between the upper first door 121a and the upper second door 121b and between the lower first door 122 and the lower second door 123.

Referring to FIG. 4, the refrigerator 100 may include, along with the body 101, the storage compartment 110, and the door 120, a touchscreen display 130, a temperature sensor 140, a camera 150, a range sensor 160, a cooler 170, a communication device 180, and a controller 190.

The touchscreen display 130 may include a display panel 131 configured to display an image and a touch panel 132 configured to receive a touch input.

Referring to FIG. 5, the display panel 131 may convert image data received from the controller 190 into an optical signal that can be seen by a user.

As the display panel 131, a liquid crystal display (LCD) panel, a light emitting diode (LED) panel, an organic light emitting diode (OLED) panel, a micro light emitting diode (μLED) panel, a plasma display panel (PDP), or the like may be adopted. However, the display panel 131 is not limited thereto, and various other displays that can visually display an optical image corresponding to image data may be adopted as the display panel 131.

As illustrated in FIG. 5, the touch panel 132 may receive a touch input from a user and output an electrical signal corresponding to the received touch input to the controller 190.

For example, the touch panel 132 may detect a user's touch on the touch panel 132 from a change in an electrical resistance value or a change in capacitance and may output an electrical signal corresponding to coordinates of a point of the user's touch to the controller 190. The controller 190 may identify the coordinates of the point of the user's touch based on the electrical signal received from the touch panel 132. Also, the controller 190 may identify an input from the user based on the coordinates of the point of the user's touch.

The touch panel 132 may be positioned on a front surface of the display panel 131. In other words, the touch panel 132 may be provided on a surface where an image is displayed. Accordingly, the touch panel 132 may be formed of a transparent material so that an image displayed on the display panel 131 is not distorted.

A resistive touch panel or a capacitive touch panel may be adopted as the touch panel 132. However, the touch panel 132 is not limited thereto, and various other touch panels that can detect a user's touch or approach and output an electrical signal corresponding to coordinates of a point of the detected touch or coordinates of a point of the detected approach may be adopted as the touch panel 132.

In this way, the touchscreen display 130 may receive a touch input from a user, transmit the received touch input to the controller 190, and display an image from the controller 190 in response to the user's touch input. In other words, the touchscreen display 130 may interact with the user.

The touchscreen display 130 may be installed on the door 120 for convenience of the user. For example, as illustrated in FIG. 3, the touchscreen display 130 may be installed on the upper second door 121b. Although the touchscreen display 130 installed on the upper second door 121b is described herein, the installation position of the touchscreen display 130 is not limited to the upper second door 121b. For example, the touchscreen display 130 may be installed at any other positions that can be seen by a user, such as on the upper first door 121a, the lower first door 122, the lower second door 123, and the cabinet 103 of the body 101.

The temperature sensor 140 may be provided inside the storage compartment 110 and may include a plurality of temperature sensors configured to detect a temperature inside the storage compartment 110.

Each of the plurality of temperature sensors may be installed in one of the plurality of storage compartments 111, 112, and 113 to detect a temperature of each of the plurality of storage compartments 111, 112, and 113 and may output an electrical signal corresponding to the detected temperature to the controller 190. Each of the plurality of temperature sensors may include a thermistor whose electrical resistance changes according to temperature.

The camera 150 may be installed inside the storage compartment 110 to obtain an image of the inside of the storage compartment 110. For example, as illustrated in FIG. 2, the camera 150 may be installed on an inner side of the door 120 and may capture an image from the inner side of the door 120 toward the inside of the storage compartment 110. Accordingly, the camera 150 may capture an image of the inside of the storage compartment 110 in substantially the same direction as a direction of a gaze of the user.

The camera 150 may include image sensors 151, 152, and 153 configured to capture an image and convert the captured image into an electrical signal. The image sensor 151 may include a plurality of photodiodes configured to convert an optical signal into an electrical signal, and the plurality of photodiodes may be arranged two-dimensionally. For example, the image sensor 151 may include a charge-coupled device (CCD) image sensor or a complementary metal-oxide-semiconductor (CMOS) image sensor.

The camera 150 may include a plurality of image sensors 151a, 151b, and 151c in order to capture an image of the inside of the storage compartment 110 divided by the shelf 110c. For example, the camera 150 may include a first image sensor 151a configured to capture an image of the first storage space 111a of the upper storage compartment 111, a second image sensor 151b configured to capture an image of the second storage space 111b, and a third image sensor 151c configured to capture an image of the third storage space 111c.

In particular, in the case in which foods are stored in the storage compartment 110, an image of the storage compartment 110 captured by the camera 150 may include an image of the foods stored in the storage compartment 110.

The camera 150 may transmit the captured image to the controller 190. Specifically, the camera 150 may transmit the image of the storage compartment 110 including the image of the foods to the controller 190.

The range sensor 160 may measure a distance to an object located around the refrigerator 100, in particular, a distance to a user. For example, as illustrated in FIG. 3, the range sensor 160 may be provided in the vicinity of the touchscreen display 130.

An example of the range sensor 160 may include an infrared transceiver. An infrared LED may emit infrared rays toward a front of the refrigerator 100, and a photodiode may receive infrared rays reflected by an object and/or a user located in front of the refrigerator 100. The range sensor 160 may identify an approximate distance to the object and/or user based on an intensity of the received infrared rays or may identify an approximate distance to the object and/or user based on a difference between the time at which infrared rays are transmitted and the time at which infrared rays are received.

Also, an example of the range sensor 160 may include an ultrasonic transceiver. An ultrasonic transmitter may emit ultrasonic waves toward a front of the refrigerator 100, and an ultrasonic receiver may receive ultrasonic waves reflected by an object and/or a user located in front of the refrigerator 100. The range sensor 160 may identify an approximate distance to the object and/or user based on a difference between a phase of the transmitted ultrasonic waves and a phase of the received ultrasonic waves.

Also, an example of the range sensor 160 may include a transceiving antenna. A transmitting antenna may emit frequency-modulated radio waves toward a front of the refrigerator 100, and a receiving antenna may receive radio waves reflected by an object and/or a user located in front of the refrigerator 100. The range sensor 160 may identify an approximate distance to the object and/or user based on a difference between a frequency of the transmitted radio waves and a frequency of the received radio waves.

The range sensor 160 may provide information related to a distance to a user to the controller 190.

The cooler 170 may supply cooled air to the storage compartment 110. Specifically, the cooler 170 may use circulation of a refrigerant in a refrigerant circuit to maintain the temperature of the storage compartment 110 within a range designated by the user.

The cooler 170 may include a compressor 171 configured to compress a refrigerant in a gaseous state, a condenser 172 configured to convert the compressed refrigerant in the gaseous state into a liquid state, an expander 173 configured to decompress the refrigerant in the liquid state, and an evaporator 174 configured to convert the decompressed refrigerant in the liquid state into a gaseous state. The cooler 170 may cool air of the storage compartment 110 by using a phenomenon in which the refrigerant in the liquid state absorbs heat energy of surrounding air while being converted into a gaseous state.

However, the cooler 170 is not limited to including the refrigerant circuit. For example, the cooler 170 may include a Peltier element using the Peltier effect or include a magnetic cooling material using a magneto-caloric effect.

The communication device 180 may exchange data with the external devices 10, 20, 30, 50, 60, and 70 such as the server devices 10, 20, and 30 and/or the user device 50 and/or the display device 60 and/or the cooking device 70.

The communication device 180 may include a wired communication module 182 configured to exchange data via a wire with the external devices 10, 20, 30, 50, 60, and 70 and a wireless communication module 181 configured to wirelessly exchange data with the external devices 10, 20, 30, 50, 60, and 70.

The wired communication module 182 may connect to a wired communication network and communicate with the external devices 10, 20, 30, 50, 60, and 70 through the wired communication network. For example, the wired communication module 182 may connect to the wired communication network through the Ethernet (institute of electrical and electronics engineers (IEEE) 802.3 standard) and may receive data from the external devices 10, 20, 30, 50, 60, and 70 through the wired communication network.

The wireless communication module 181 may wirelessly communicate with a base station or an AP and may connect to the wired communication network through the base station or AP. The wireless communication module 181 may also communicate with the external devices 10, 20, 30, 50, 60, and 70, which are connected to the wired communication network, through the base station or AP. For example, the wireless communication module 181 may wirelessly communicate with the AP using WiFi™ (IEEE 802.11 standard) or communicate with the base station using code division multiple access (CDMA), wideband code division multiple access (WCDMA), global system for mobile communication (GSM), long term evolution (LTE), wireless broadband (WiBro), and the like. The wireless communication module 181 may also receive data from the external devices 10, 20, 30, 50, 60, and 70 via the base station or AP.

Further, the wireless communication module 181 may directly communicate with the external devices 10, 20, 30, 50, 60, and 70. For example, the wireless communication module 181 may wirelessly receive data from the external devices 10, 20, 30, 50, 60, and 70 using Wi-Fi™, Bluetooth™ (IEEE 802.15.1 standard), ZigBee™ (IEEE 802.15.4 standard), and the like.

In this way, the communication device 180 may exchange data with the external devices 10, 20, 30, 50, 60, and 70 and may output data received from the external devices 10, 20, 30, 50, 60, and 70 to the controller 190.

The controller 190 may process a user input and/or detected data and/or communication data and may control the configurations included in the refrigerator 100 based on the processed data.

The controller 190 includes a memory 192 configured to store/recall a program and/or data and a processor 191 configured to process a user input and/or detected data and/or communication data according to the program and/or data recalled in the memory 192. In addition to hardware such as the memory 192 and the processor 191, the controller 190 may further include software such as the program and/or data recalled in the memory 192 and processed in the processor 191.

The memory 192 may store/recall a program and/or data. The program may include a plurality of instructions combined to perform a specific function, and the data may be processed by the plurality of instructions included in the program. Also, the program and/or data may include a system program and/or system data directly related to the operations of the refrigerator 100 and an application program and/or application data configured to offer convenience and fun to a user.

The memory 192 may include a nonvolatile memory configured to store a program and/or data for controlling the configurations included in the refrigerator 100 and a volatile memory configured to recall temporary data generated during the control of the configurations included in the refrigerator 100.

For example, the nonvolatile memory may store a program and/or data electrically, magnetically, or optically. Examples of the nonvolatile memory may include a read-only memory (ROM) and a flash memory for storing data for a long period of time. Also, an example of the nonvolatile memory may include a solid state drive (SSD), a hard disk drive (HDD), an optical disc drive (ODD), or the like.

For example, the volatile memory may load a program and/or data from the nonvolatile memory and electrically recall the program and/or data. Examples of the volatile memory may include a static random access memory (S-RAM), a dynamic random access memory (D-RAM), and the like for temporarily recalling data.

The memory 192 may store/recall a program and data such as an operating system (OS), middleware, and an application and may provide the program and data to the processor 191 in response to a request from the processor 191.

The processor 191 may process a user input to the touchscreen display 130 and/or detected data of the range sensor 160 and/or communication data of the communication device 180 according to the program and/or data recalled/stored in the memory 192. Also, based on the processed data, the processor 191 may generate a control signal for controlling operations of the camera 150, the touchscreen display 130, and/or the communication device 180.

For example, the processor 191 may receive temperature information of the storage compartment 110 from the temperature sensor 140 and, based on the temperature information of the storage compartment 110, generate a cooling control signal for controlling the operation of the cooler 170. The processor 191 may receive a user's touch input from the touchscreen display 130 and may, in response to the user's touch input, transmit a display control signal and image data for displaying an image on the touchscreen display 130 to the touchscreen display 130. The processor 191 may generate an image-capturing control signal so that the camera 150 captures an image of the inside of the storage compartment 110 as soon as the door 120 in an open state is closed and may receive the image of the inside of the storage compartment 110 from the camera 150. The processor 191 may process the image of the inside of the storage compartment 110 received from the camera 150 and may, based on the processed image, identify foods included in the captured image. Based on the identified foods, the processor 191 may generate a display control signal for displaying food-related information on the touchscreen display 130.

The processor 191 may include a core configured to perform a logical operation, an arithmetic operation, and the like and a register configured to recall operated data.

In this way, the controller 190 may process data collected from the sensors and, based on the processed data, control the configurations included in the refrigerator 100. In particular, the controller 190 may provide various pieces of information to a user through the touchscreen display 130.

Hereinafter, the case in which the refrigerator 100 provides information through the touchscreen display 130 will be described.

Figure 6:
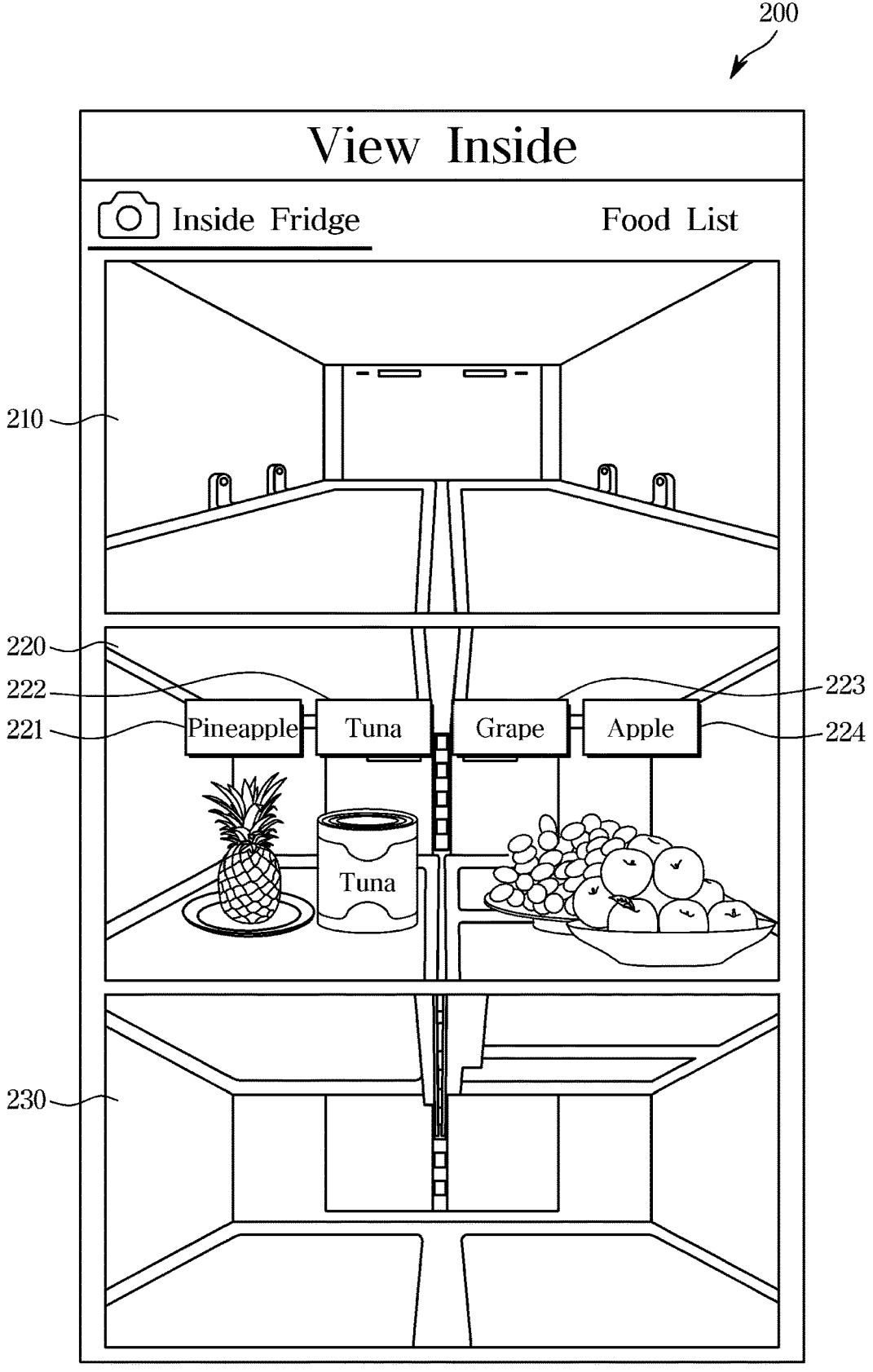
FIG. 6 illustrates an example of a screen showing images captured by a refrigerator and identification of foods according to an embodiment of the disclosure.

FIG. 6 illustrates an example of a screen showing images captured by a refrigerator and identification of foods according to an embodiment of the disclosure.

As described above, the refrigerator 100 may capture an image of the inside of the storage compartment 110. The controller 190 may control the camera 150 to capture an image of the inside of the storage compartment 110 when the door 120 is closed and may obtain image data from the camera 150.

Referring to FIG. 6, the controller 190 may display a page 200 including images obtained from the camera 150 on the touchscreen display 130. For example, the controller 190 may display each of an image 210 of an inside of the first storage space 111a, an image 220 of an inside of the second storage space 111b, and an image 230 of an inside of the third storage space 111c on the touchscreen display 130.

Based on processing of the image data obtained from the camera 150, the controller 190 may identify foods captured by the camera 150 (that is, foods included in the images captured by the camera).

For example, the controller 190 may include a neural network for machine learning. The neural network may include an input layer to which image data is input, an output layer to which information on identified objects is output, and a hidden layer between the input layer and the output layer. The input layer may include a plurality of input nodes to each of which a luminance value of a pixel of an image is input. The hidden layer may include a plurality of hidden nodes to each of which a value obtained by applying first weighted values to the values of the plurality of input nodes is input. The output layer may include a plurality of output nodes to each of which a value obtained by applying second weighted values to the values of the plurality of hidden nodes is input. The foods included in the image may be identified based on the values of the plurality of output nodes.

As illustrated in FIG. 6, the controller 190 may display, along with the images obtained from the camera 150, pieces of identification information (for example, names) of foods identified from the image data. For example, the controller 190 may display identification information 221 of pineapple, identification information 222 of canned tuna, identification information 223 of grape, and identification information 224 of apple on any of the images 210, 220, and 230 of the inside of the storage compartment 110.

Although the case in which the controller 190 identifies foods captured by the camera 150 based on processing of the image data obtained from the camera 150 has been described above, the disclosure is not limited thereto. For example, the controller 190 may control the communication device 180 to send the image data obtained from the camera 150 to any of the server devices and may obtain pieces of identification information of foods captured by the camera 150 from any of the server devices through the communication device 180.

The controller 190 may control the communication device 180 to send the pieces of identification information of foods captured by the camera 150 to the second server device 20 and/or the third server device 30. The second server device 20 may, based on the received pieces of identification information of the foods, provide a meal plan and/or a recipe therefor to the refrigerator 100. Also, the third server device 30 may, based on the received pieces of identification information of the foods, provide a recommendation of foods to buy to the refrigerator 100.

In this way, the controller 190 may receive a meal plan and/or a recipe therefor from the second server device 20 through the communication device 180 and may receive a recommendation of foods to buy from the third server device 30 through the communication device 180.

Figure 7:
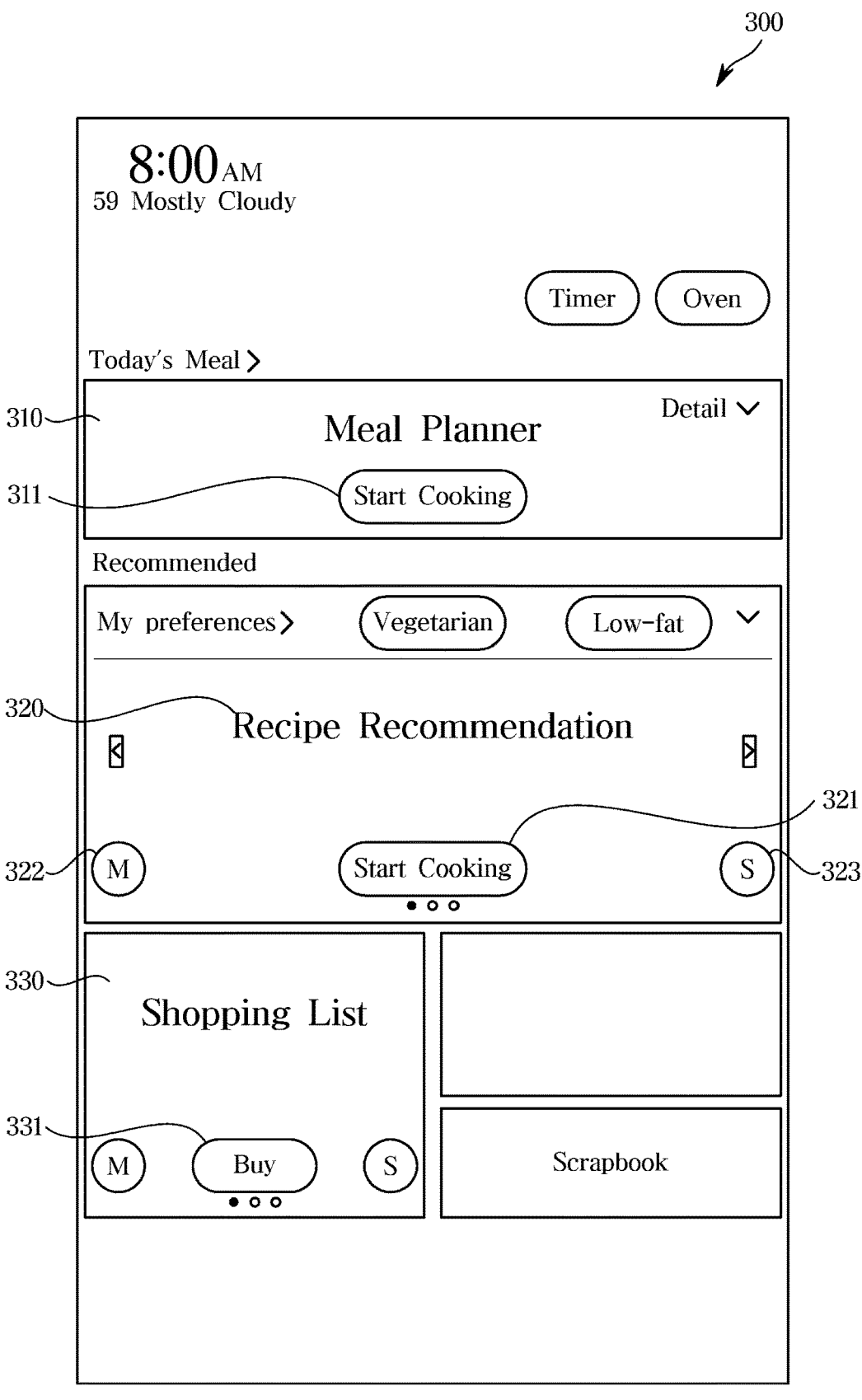
FIG. 7 illustrates one example of a page displayed on a touchscreen display included in a refrigerator according to an embodiment of the disclosure.

FIG. 7 illustrates one example of a page displayed on a touchscreen display included in a refrigerator according to an embodiment of the disclosure.

Figure 8:
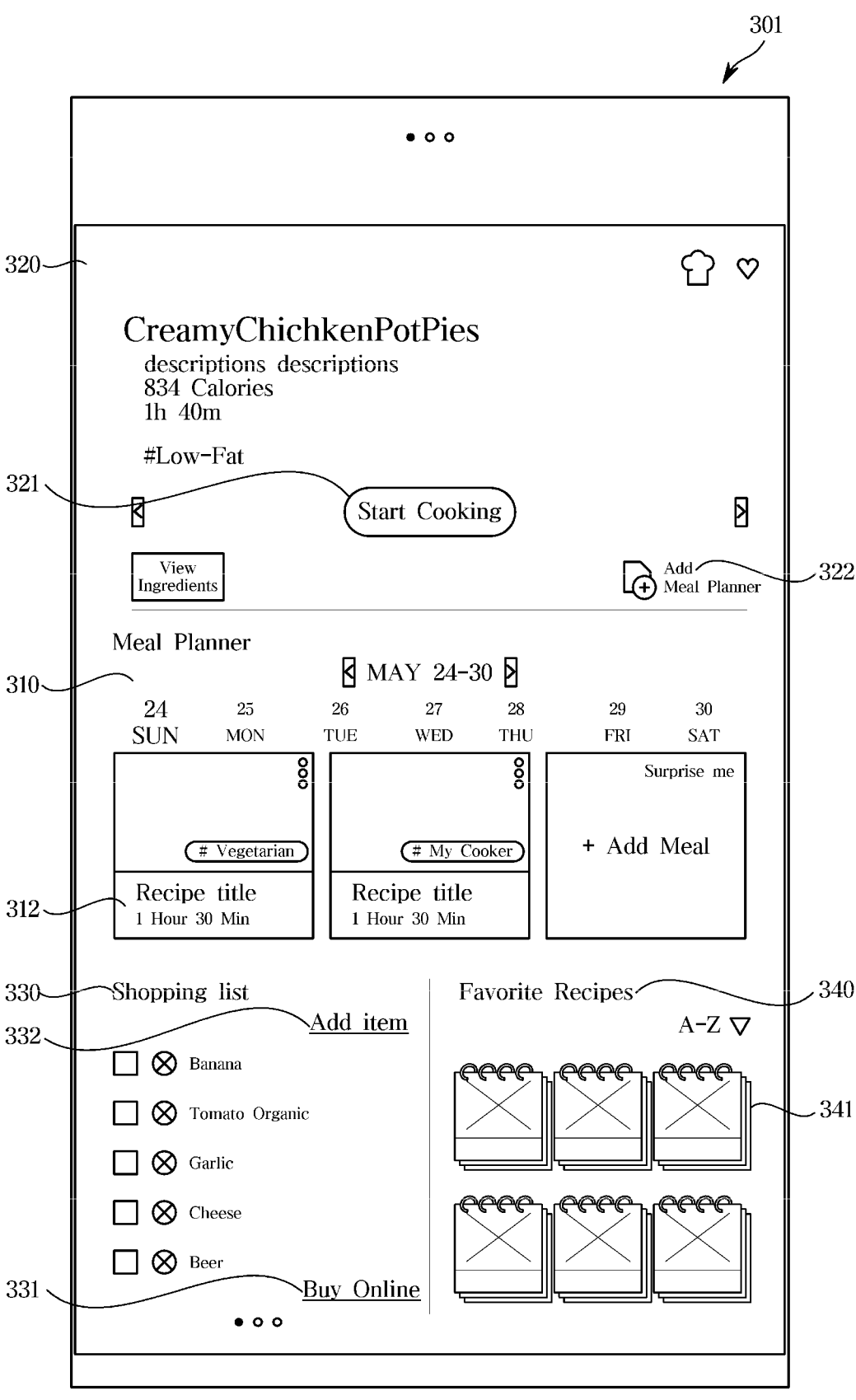
FIG. 8 illustrates another example of a page displayed on a touchscreen display included in a refrigerator according to an embodiment of the disclosure.

FIG. 8 illustrates another example of a page displayed on a touchscreen display included in a refrigerator according to an embodiment of the disclosure.

Referring to FIGS. 7 and 8, the controller 190 may display the meal plan and/or recipe therefor received from the second server device 20 and the recommendation of items to buy received from the third server device 30 on the touchscreen display 130 through a single page (or screen) 200.

The controller 190 may, in response to a user input (for example, a touch input) through the touchscreen display 130, launch an application for meal plan management.

The controller 190 may process a series of instructions included in the application and may, in response to launching of the application, display a page 300, such as that illustrated in FIG. 7, on the touchscreen display 130.

The page 300 due to the application for meal plan management may include a meal plan area 310 configured to display a meal plan received from the second server device 20, a recipe area 320 configured to display a recipe received from the second server device 20, and a shopping list area 330 configured to display a list of items to be bought through the third server device 30.

A meal plan received from the second server device 20 may be displayed in the meal plan area 310. For example, the controller 190 may, in the meal plan area 310, display diet of the corresponding day (today) from a meal plan received from the second server device 20. Also, the controller 190 may, in the meal plan area 310, display a meal (any one of breakfast, lunch, and dinner) of the corresponding time slot of the corresponding day (today) from the meal plan received from the second server device 20.

In the meal plan area 310, a first cooking button 311 to start cooking of a meal may be provided. In response to a user input through the first cooking button 311, the controller 190 may control the communication device 180 to send a message for preheating of a cooking chamber to the cooking device 70.

In the recipe area 320, a recipe received from the second server device 20 may be displayed. For example, the controller 190 may, in the recipe area 320, display a recipe that corresponds to the diet of the corresponding day (today). Also, the controller 190 may, in the recipe area 320, display a recipe selected by a user.

In the recipe area 320, a second cooking button 321 to start cooking according to the recipe displayed in the recipe area 320 may be provided. In response to a user input through the second cooking button 321, the controller 190 may control the communication device 180 to send a message for preheating of a cooking chamber to the cooking device 70.

In the recipe area 320, a meal plan addition button 322 to add diet according to a recipe displayed in the recipe area 320 to a meal plan may be provided. In response to a user input through the meal plan addition button 322, the controller 190 may add diet displayed in the recipe area 320 to the meal plan area 310 and may display the meal plan to which the diet is added in the meal plan area 310.

In the recipe area 320, an item adding button 323 to buy food ingredients for preparing the diet displayed in the recipe area 320 may be provided. In response to a user input through the item adding button 323, the controller 190 may add the food ingredients for preparing the diet to the shopping list area 330.

In the shopping list area 330, a list of items to be bought through the third server device 30 may be displayed. For example, the controller 190 may, in the shopping list area 330, display a list of items recommended to be bought received from the third server device 30 and/or foods for preparing the diet that are received from the second server device 20.

In the shopping list area 330, a buying button 331 to buy the items displayed in the shopping list area 330 may be provided. In response to a user input through the buying button 331, the controller 190 may send a request to buy the items displayed in the shopping list area 330 to the third server device 30 and may display a page for buying of an item on the touchscreen display 130.

In this way, the refrigerator 100 may display a meal plan, a recipe, and a shopping list on a single page (or single screen) of the touchscreen display 130. Accordingly, a user may check a meal plan, check a recipe, and buy food ingredients from a single page without an inconvenience of having to browse between a page for checking a meal plan, a page for checking a recipe for preparing diet, and a page for buying food ingredients according to the recipe.

The single page providing checking of a meal plan, checking of a recipe, and buying of food ingredients is not limited to that illustrated in FIG. 7.

For example, in response to launching of an application for meal plan management, the controller 190 may display a page 301 illustrated in FIG. 8 on the touchscreen display 130.

The page 301 due to the application for meal plan management may include a recipe area 320 configured to display a recipe received from the second server device 20, a meal plan area 310 configured to display a meal plan received from the second server device 20, and a shopping list area 330 configured to display a list of items to be bought through the third server device 30. Also, the page 301 may further include a favorites area 340 configured to display a recipe selected by a user.

A recipe may be displayed in the recipe area 320. Also, in the recipe area 320, a second cooking button 321 to start cooking according to the recipe displayed in the recipe area 320 and a meal plan addition button 322 to add diet according to the recipe displayed in the recipe area 320 to a meal plan may be provided.

Diet by date may be displayed in the meal plan area 310. For example, diet of the corresponding day (today) may be displayed. Also, in the meal plan area 310, a recipe button 312 to check a recipe for the diet of the corresponding day (today) may be provided.

In the shopping list area 330, a list of items to be bought through the third server device 30 may be displayed. Also, in the shopping list area 330, an item adding button 332 to add an item to the shopping list and a buying button 331 to buy the items displayed in the shopping list area 330 may be provided.

In the favorites area 340, a recipe for food especially selected by a user may be displayed. The user may select a recipe for the diet displayed in the meal plan area 310 or a recipe displayed in the recipe area 320 as a favorite recipe 341. The recipe selected by the user is displayed in the favorites area 340, and unless a separate user input is made, the favorite recipe 341 may still be displayed in the favorites area 340 even when time passes or the date is changed. In other words, the user may easily check the favorite recipe 341 from the favorites area 340 any time.

As described above, the refrigerator 100 may provide a page for checking a meal plan, checking a recipe, and buying food to a user, and accordingly, the user may check a meal plan, check a recipe, and buy food from a single page without browsing between pages.

Figure 9:
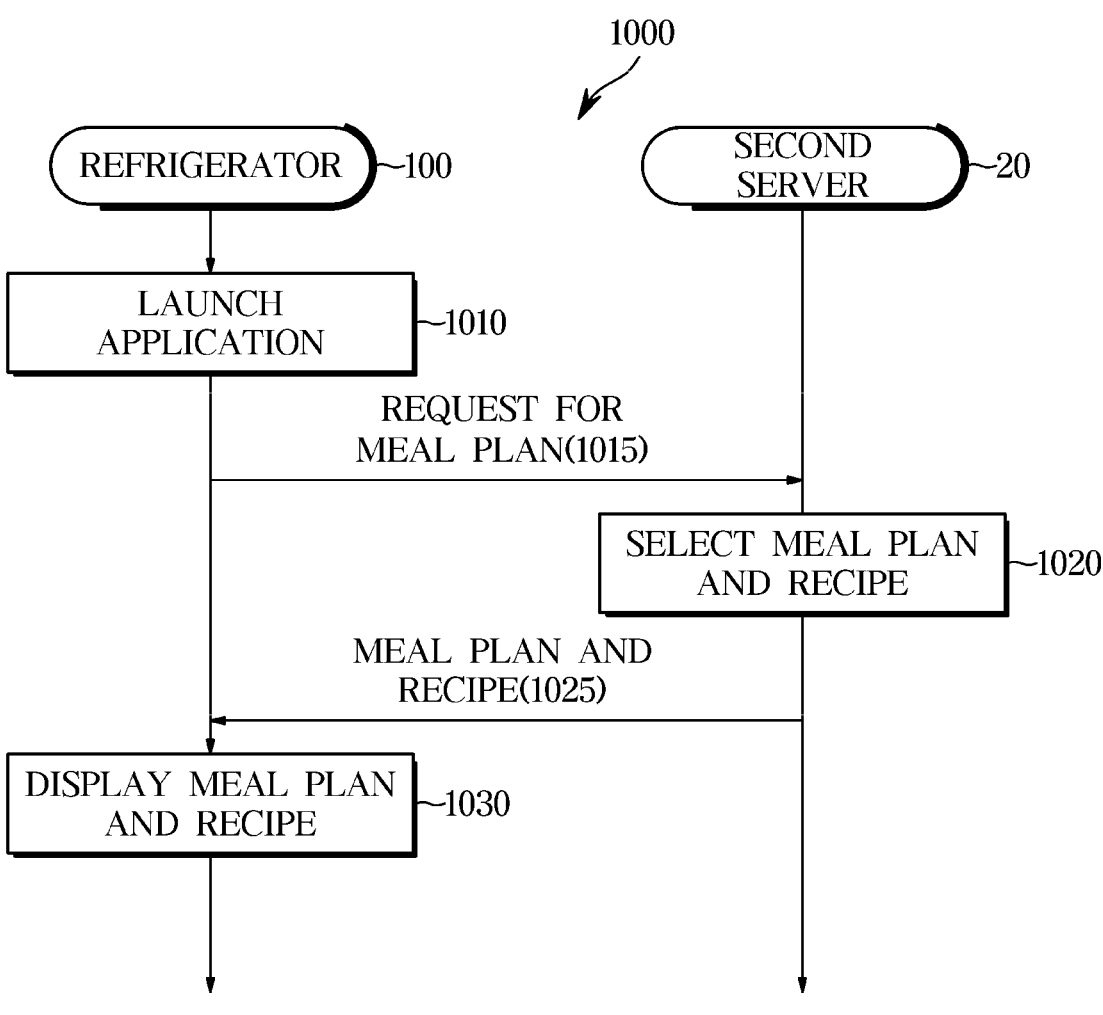
FIG. 9 illustrates one example in which a refrigerator obtains a meal plan and/or a recipe according to an embodiment of the disclosure.

FIG. 9 illustrates one example in which a refrigerator obtains a meal plan and/or a recipe according to an embodiment of the disclosure.

Referring to FIG. 9, a method (1000) by which the refrigerator obtains a meal plan and/or a recipe therefor will be described.

The refrigerator 100 launches an application in response to a user input (1010).

The controller 190 may obtain a user input to launch an application through the touchscreen display 130. The controller 190 may launch the application in response to the user input.

The refrigerator 100 requests the second server device 20 for a meal plan and a recipe (1015).

The controller 190 may, according to instructions constituting the launched application, control the communication device 180 to send a message that requests the second server device 20 for a meal plan and a recipe.

The second server device 20 selects a meal plan and a recipe in response to the message requesting for a meal plan and a recipe that is received from the refrigerator 100 (1020).

The second server device 20 may include a database containing various foods and recipes for the foods. For example, the database of the second server device 20 may include foods commonly consumed in each country and recipes for the foods. The database of the second server device 20 may also include foods commonly consumed according to season and recipes for the foods. The database of the second server device 20 may also include foods commonly consumed according to weather and recipes for the foods.

Also, the second server device 20 may provide communities of various topics relating to foods and food ingredients and provide an interface that allows a user to download a recipe from or upload a recipe to the communities.

In this way, the second server device 20 may include a database containing various foods and recipes therefor according to various items such as country, geographical location, season, weather, time slot, food ingredient, and recipe.

Based on the user's country, geographical location, favorite food ingredient, favorite recipe, nonpreferred food ingredient, nonpreferred recipe, cooking experience, and the like, the second server device 20 may use the database to create a meal plan and select recipes for foods included in the meal plan. For example, the second server device 20 may include a machine learning model (or machine learning engine) for selecting food and a recipe therefor according to various items such as the user's country, geographical location, favorite food ingredient, favorite recipe, nonpreferred food ingredient, nonpreferred recipe and cooking experience. The second server device 20 may use the machine learning model (or machine learning engine) to select food and a recipe therefor and recommend the selected food and recipe therefor to the user.

The second server device 20 merely receives the message requesting for a meal plan and a recipe from the refrigerator 100. Accordingly, the second server device 20 may, based on preferences information at the time at which the message is received from the refrigerator 100, create a meal plan and select a recipe for food included in the meal plan. For example, the second server device 20 may create a meal plan and select a recipe for food included in the meal plan based on the time slot during which the request message is received and/or the date (or season) on which the request message is received and/or the weather of the day the request message is received and/or the food trend at the time the request message is received.

The second server device 20 sends information on the meal plan and recipe therefor to the refrigerator 100 (1025).

In response to receiving the information on the meal plan and recipe therefor from the second server device 20, the refrigerator 100 displays the meal plan and recipe therefor (1030).

The controller 190 may, according to instructions constituting the launched application, control the touchscreen display 130 to display the meal plan and recipe therefor received from the second server device 20. For example, the controller 190 may control the touchscreen display 130 to display the page 300 including the meal plan area 310 and the recipe area 320 as illustrated in FIG. 7. The meal plan received from the second server device 20 may be displayed in the meal plan area 310, and the recipe received from the second server device 20 may be displayed in the recipe area 320. Further, the controller 190 may control the touchscreen display 130 to display the page 301 including the meal plan area 310 and the recipe area 320 as illustrated in FIG. 8.

In this way, without obtaining user information from the user, the refrigerator 100 may display a meal plan and a recipe therefor based on foods (or food ingredients) stored in the storage compartment 110, season, weather, a time slot, and the like.

Figure 10:
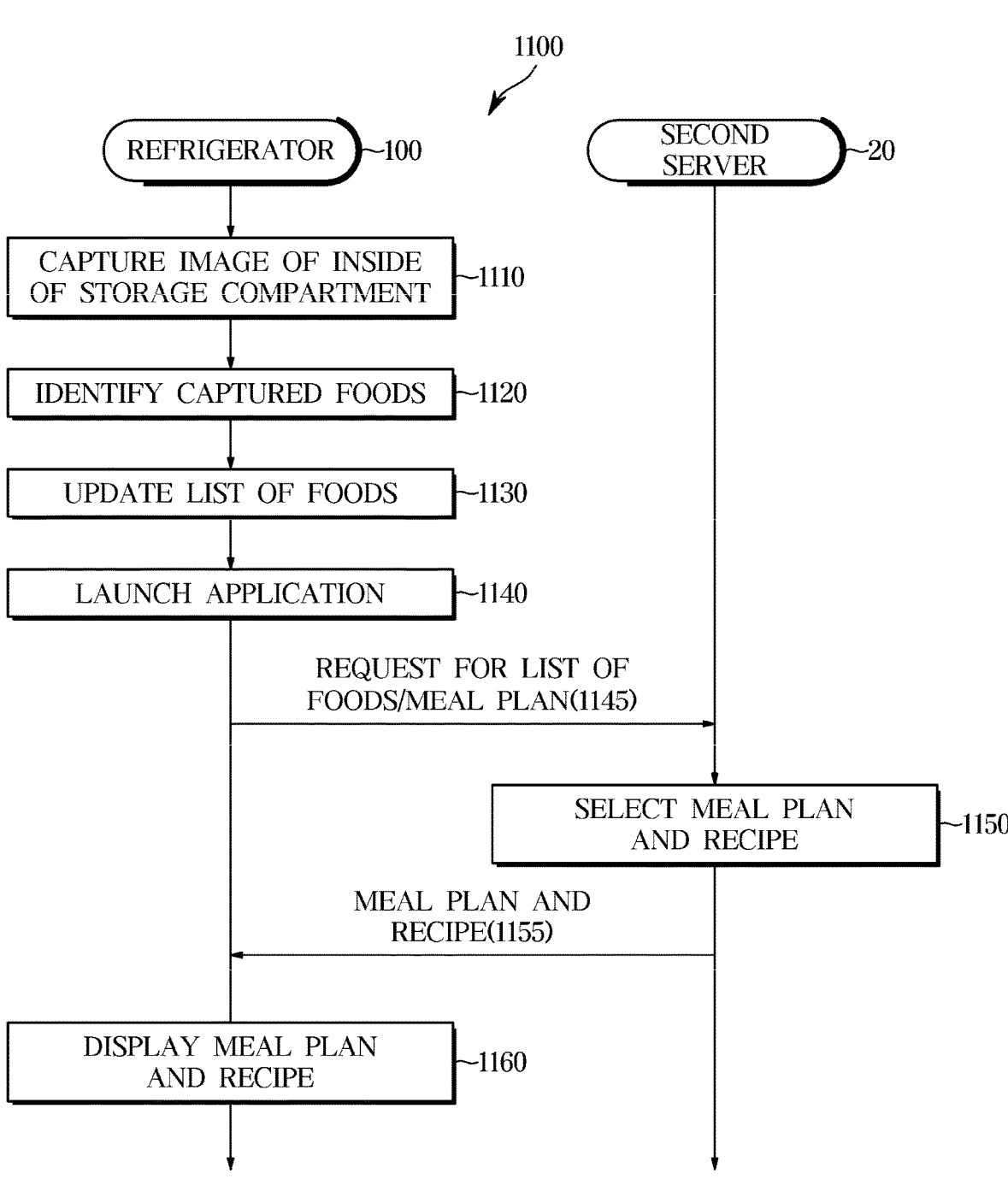
FIG. 10 illustrates one example in which a refrigerator obtains a meal plan and/or a recipe according to an embodiment of the disclosure.

FIG. 10 illustrates one example in which a refrigerator obtains a meal plan and/or a recipe according to an embodiment of the disclosure.

Referring to FIG. 10, a method (1100) by which the refrigerator obtains a meal plan and/or a recipe therefor will be described.

The refrigerator 100 captures an image of the inside of the storage compartment 110 (1110).

For example, the controller 190 may control the camera 150 to capture an image of the inside of the storage compartment 110 when closing of the door 120 in an open state is detected. The camera 150 may capture an image of the storage compartment 110 and provide the captured image data to the controller 190. The controller 190 may obtain the image data of the storage compartment 110 from the camera 150.

As another example, the controller 190 may control the camera 150 to capture an image of the inside of the storage compartment 110 in response to a user input through the touchscreen display 130 and may obtain the image data of the storage compartment 110 from the camera 150.

Also, the controller 190 may, in response to a user input, display the image of the storage compartment 110 captured by the camera 150 on the touchscreen display 130.

The refrigerator 100 identifies foods (or food ingredients) captured by the camera 150 (1120).

For example, the controller 190 may include a neural network for machine learning. The controller 190 may input the captured image into the neural network and, based on an output from the neural network, identify foods captured by the camera 150 (that is, foods or food ingredients included in the image captured by the camera).

As another example, the controller 190 may control the communication device 180 to send the image data of the storage compartment 110 to an external server device. The external server device may include a neural network for machine learning and may use the neural network to identify foods (or food ingredients) included in the image data. The controller 190 may receive information on the foods (or food ingredients) from the external server device through the communication device 180.

The refrigerator 100 updates a list of foods (or food ingredients) stored in the storage compartment 110 (1130).

The controller 190 may update the list of foods (or food ingredients) based on the foods (or food ingredients) identified using machine learning. Also, the controller 190 may, in response to a user input, display the list of foods (or food ingredients) stored in the storage compartment 110 on the touchscreen display 130.

The refrigerator 100 launches an application in response to a user input (operation 1140).

The controller 190 may obtain a user input to launch an application through the touchscreen display 130. The controller 190 may launch the application in response to the user input.

The refrigerator 100 requests the second server device 20 for a meal plan and a recipe (operation 1145).

The controller 190 may, according to instructions constituting the launched application, control the communication device 180 to send a message that requests the second server device 20 for a meal plan and a recipe, in addition to the list of the foods (or food ingredients).

The second server device 20 selects a meal plan and a recipe in response to the message requesting for a meal plan and a recipe that is received from the refrigerator 100 (1150).

As described above in relation to the operation 1020 of FIG. 9, the second server device 20 may store a database containing various foods and recipes for the foods.

The second server device 20 merely receives the list of the foods (or food ingredients). The second server device 20 may, based on the received list of the foods (or food ingredients) and the preferences information, create a meal plan and select a recipe for food included in the meal plan.

The second server device 20 may create a meal plan based on a comparison between foods included in the current list of foods and foods included in the previous list of foods. The second server device 20 may create a meal plan including foods which are included in the previous list of foods and removed from the current list of foods. The foods included in the previous list of foods and removed from the current list of foods may be determined as foods consumed by the user.

Further, the second server device 20 may create a meal plan based on the history of the list of foods. The second server device 20 may create a meal plan including foods that are frequently added and removed among foods that are included or have been included in the list of foods. The foods frequently added and removed among the foods may be determined as foods frequently consumed by the user.

The second server device 20 may create a meal plan using the received food ingredients. In particular, the second server device 20 may create a meal plan using food ingredients that are frequently added and removed among the food ingredients. The food ingredients that are frequently added and removed among the food ingredients may be determined as foods frequently consumed by the user.

The second server device 20 sends information on the meal plan and recipe therefor to the refrigerator 100 (operation 1155). In response to receiving the information on the meal plan and recipe therefor from the second server device 20, the refrigerator 100 displays the meal plan and recipe therefor (operation 1160).

The controller 190 may, according to instructions constituting the launched application, control the touchscreen display 130 to display the meal plan and recipe therefor received from the second server device 20.

In this way, the refrigerator 100 may identify the foods (or food ingredients) stored in the storage compartment 110 and provide a meal plan and a recipe therefor based on the identified foods (or food ingredients) to the user.

Figure 11:
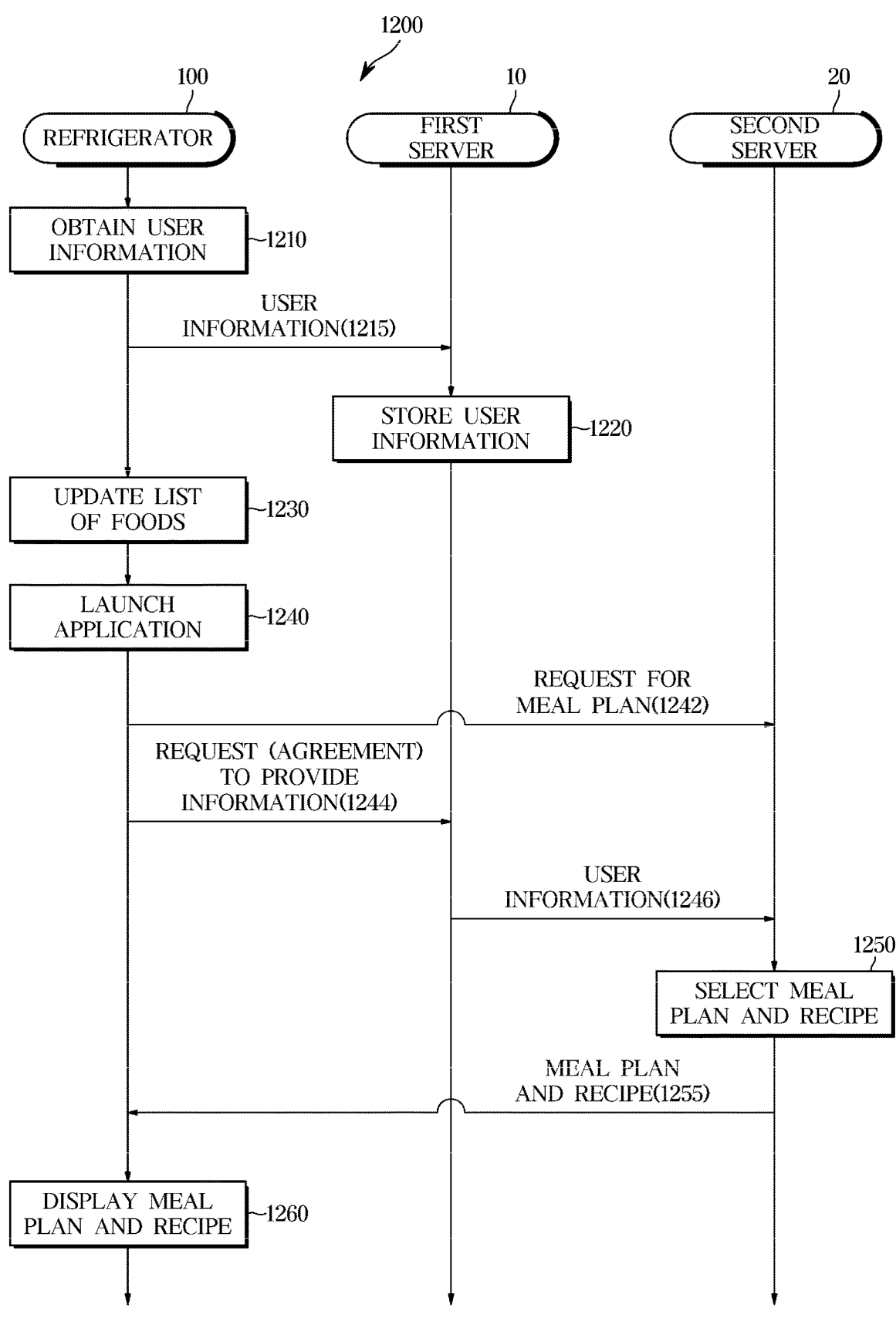
FIG. 11 illustrates one example in which a refrigerator obtains a meal plan and/or a recipe according to an embodiment of the disclosure.

FIG. 11 illustrates one example in which a refrigerator obtains a meal plan and/or a recipe according to an embodiment of the disclosure.

Referring to FIG. 11, a method (1200) by which the refrigerator obtains a meal plan and/or a recipe therefor will be described.

The refrigerator 100 obtains user information (1210).

The refrigerator 100 may recommend a user to create an account in the first server device 10 to provide a more variety of services to the user. For example, the first server device 10 may create an account of a user who is signed up for a service and may store/manage the user's identification information (for example, a name, a nationality, an address, a contact number, and the like) and the user's authentication information (for example, an ID, a password, biometric information (a fingerprint or an iris), and the like).

The controller 190 may control the touchscreen display 130 to display a page for collecting the user's identification information and authentication information. For example, through the touchscreen display 130, the controller 190 may collect the user's name, nationality, address, and contact number and collect the user's ID, password, biometric information (fingerprint or iris), and the like.

Also, the refrigerator 100 may collect information on the user's food preferences.

Specifically, the controller 190 may display a page for collecting the information on the user's food preferences on the touchscreen display 130 and, based on an input from the user through the touchscreen display 130, obtain the information on the user's food preferences.

For example, the controller 190 may collect the diet and food type preferred by the user, foods avoided by the user, the number of family members of the user, food ingredients preferred by the user, food ingredients avoided by the user, recipes preferred by the user, cooking experiences of the user, and the like.

In relation to the diet preferred by the user, the controller 190 may display on the touchscreen display 130 an interface that allows the user to select one or more of pescatarian, vegan, vegetarian, dairy-free, low-carb, ketogenic, detox, and the like.

In relation to the food type preferred by the user, the controller 190 may display on the touchscreen display 130 an interface that allows the user to select one or more of healthy, high-protein, low-sugars, low-sodium, low-fat, low-energy, low-fiber, and the like.

In relation to the foods avoided by the user, the controller 190 may display on the touchscreen display 130 an interface that allows the user to select one or more of alcohol, caffeine, egg, fish, gluten, nuts, mustard, soy sauce, wheat, and the like.

The controller 190 may display on the touchscreen display 130 an interface that allows the user to input the number of his or her family members.

In relation to the food ingredients preferred by the user, the controller 190 may display on the touchscreen display 130 an interface that allows the user to select one or more of beef, pork, chicken, fish, tomato, potato, carrot, onion, green onion, garlic, cheese, egg, and the like.

The controller 190 may display on the touchscreen display 130 an interface that allows the user to input the food ingredients avoided by the user.

In relation to the recipes preferred by the user, the controller 190 may display on the touchscreen display 130 an interface that allows the user to select one or more of American, Chinese, Japanese, French, Indian, Korean, Thai, Spanish, Mexican, and the like.

In relation to the cooking experiences of the user, the controller 190 may display on the touchscreen display 130 an interface that allows the user to select one of amateur, intermediate, and advanced.

In this way, the user information collected by the refrigerator 100 may include identification information, authentication information, and food preference information.

The refrigerator 100 sends the collected user information to the first server device 10 (operation 1215).

The controller 190 may control the communication device 180 to send the identification information, authentication information, and food preference information to the first server device 10.

The first server device 10 stores the received user information (operation 1220).

The first server device 10 may create a user account based on the received identification information and authentication information. Also, the first server device 10 may, in relation to the created user account, store the user's identification information, authentication information, and food preference information.

Then, the refrigerator 100 updates a list of foods stored in the storage compartment 110 (operation 1230).

The operation 1230 may be the same as the operation 1110, operation 1120, and operation 1130 illustrated in FIG. 10.

The controller 190 may control the camera 150 to capture an image of the inside of the storage compartment 110 and may identify foods (or food ingredients) based on the image data obtained from the camera 150. Specifically, the controller 190 may use machine learning to identify foods (or food ingredients). The controller 190 may update the list of foods (or food ingredients) based on the identified foods (or food ingredients).

The refrigerator 100 launches an application in response to a user input (operation 1240).

The description of the operation 1240 may be substituted with the above description of the operation 1140 illustrated in FIG. 10.

The refrigerator 100 requests the second server device 20 for a meal plan and a recipe (operation 1242).

The description of the operation 1242 may be substituted with the above description of the operation 1145 illustrated in FIG. 10.

The refrigerator 100 sends, to the first server device 10, a message requesting for provision of the user information or a message agreeing to the request for the provision of the user information of the first server device 10 (operation 1244). In response to the message from the refrigerator 100, the first server device 10 sends the user information to the second server device 20 (operation 1246).

In order to provide a meal plan and a recipe therefor that are suitable for the user's taste, the second server device 20 may request the first server device 10 or the refrigerator 100 for the user information.

The refrigerator 100 may, in response to the request of the second server device 20 for the information, display a page for agreeing to provide the user information and may, in response to a user input agreeing to provide the user information, send a message agreeing to provide the user information to the first server device 10. The first server device 10 may, in response to the message from the refrigerator 100, send limited identification information, such as a nationality and an address, of the user and food preference information of the user to the second server device 20.

Also, the first server device 10 may, in response to the request of the second server device 20 for the information, request the refrigerator 100 for agreement to provide the user information. The refrigerator 100 may, in response to a user input agreeing to provide the user information, send a message agreeing to provide the user information to the first server device 10. The first server device 10 may, in response to the message from the refrigerator 100, send limited identification information, such as a nationality and an address, of the user and food preference information of the user to the second server device 20.

The second server device 20 selects a meal plan and a recipe in response to the message requesting for a meal plan and a recipe that is received from the refrigerator 100 (operation 1250).

The second server device 20 may receive a list of foods (or food ingredients) from the refrigerator 100 and obtain user information from the first server device 10. The user information may include limited identification information, such as a nationality and an address, of the user and food preference information of the user.

The second server device 20 may create a meal plan based on the list of foods (or food ingredients), user information, and preferences information and may select a recipe for foods included in the meal plan.

The second server device 20 may create a meal plan including foods based on the nationality and address included in the user information.

The second server device 20 may create a meal plan based on the diet and food type preferred by the user, foods avoided by the user, the number of family members of the user, food ingredients preferred by the user, and food ingredients avoided by the user. For example, the second server device 20 may create a meal plan that includes foods corresponding to the diet, food type, and food ingredients preferred by the user while excluding the foods and food ingredients avoided by the user.

Also, the second server device 20 may select a recipe for foods based on the recipes preferred by the user and the cooking experiences of the user.

The second server device 20 sends information on the meal plan and recipe therefor to the refrigerator 100 (operation 1255). In response to receiving the information on the meal plan and recipe therefor from the second server device 20, the refrigerator 100 displays the meal plan and recipe therefor (operation 1260).

The descriptions of the operation 1255 and operation 1260 may be substituted with the above descriptions of the operation 1155 and operation 1160 illustrated in FIG. 10.

In this way, the refrigerator 100 may obtain the user's identification information and food preference information from the user and provide a meal plan and a recipe therefor based on the obtained identification information and food preference information to the user.

Figure 12:
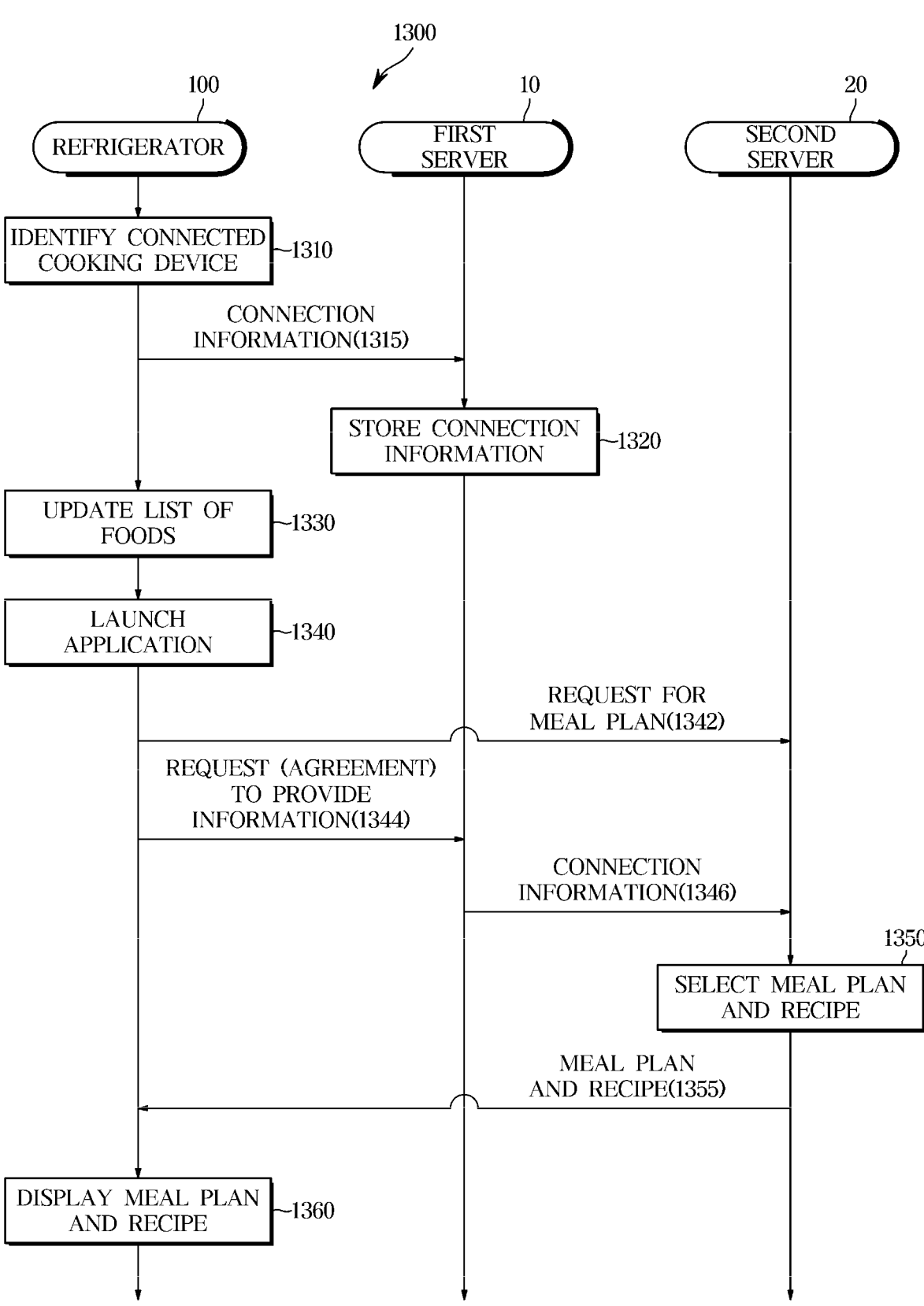
FIG. 12 illustrates one example in which a refrigerator obtains a meal plan and/or a recipe according to an embodiment of the disclosure.

FIG. 12 illustrates one example in which a refrigerator obtains a meal plan and/or a recipe according to an embodiment of the disclosure.

Referring to FIG. 12, a method (1300) by which the refrigerator obtains a meal plan and/or a recipe therefor will be described.

The refrigerator 100 identified the cooking device 70 connected thereto (1310).

The controller 190 may identify the cooking device 70 that can be linked to the refrigerator 100. For example, the controller 190 may search for the cooking device 70 connected to the same AP as the refrigerator 100. Here, for example, the cooking device 70 may include any cooking device that can be electrically controlled and can communicate wirelessly or via a wire through the AP, such as a gas oven, an electric oven, a microwave oven, a toaster, and a rice cooker.

The controller 190 may request the AP for a list of devices connected to the AP. The controller 190 may, based on the list received from the AP, identify the cooking device 70 connected to the same AP as the refrigerator 100.

Also, the controller 190 may request other devices for device information through the AP. The controller 190 may, based on the device information received from the other devices through the AP, identify the cooking device 70 connected to the same AP as the refrigerator 100.

The controller 190 may generate connection information including a list of identified cooking devices 70. The connection information may include identification information of the cooking device 70 and a heating method (for example, broiling, grilling, convection, microwaves, and the like) of the cooking device 70.

The refrigerator 100 sends the connection information of the refrigerator 100 to the first server device 10 (operation 1315).

The controller 190 may control the communication device 180 to send the identification information of the cooking device 70 and the heating method of the cooking device 70 to the first server device 10.

The first server device 10 stores the connection information of the refrigerator 100 (operation 1320).

In relation to a created user account, the first server device 10 may store the connection information of the refrigerator 100 together.

Then, the refrigerator 100 updates a list of foods stored in the storage compartment 110 (operation 1330).

The description of the operation 1330 may be substituted with the above descriptions of the operation 1110, operation 1120, and operation 1130 illustrated in FIG. 10.

The refrigerator 100 launches an application in response to a user input (1340).

The description of the operation 1340 may be substituted with the above description of the operation 1140 illustrated in FIG. 10.

The refrigerator 100 requests the second server device 20 for a meal plan and a recipe (operation 1342).

The description of the operation 1342 may be substituted with the above description of the operation 1145 illustrated in FIG. 10.

The refrigerator 100 sends, to the first server device 10, a message requesting for provision of the connection information or a message agreeing to the request for the provision of the connection information received from the first server device 10 (operation 1344). In response to the message from the refrigerator 100, the first server device 10 sends the connection information to the second server device 20 (operation 1346).

The descriptions of the operation 1344 and operation 1346 may be substituted with the above descriptions of the operation 1244 and operation 1246 illustrated in FIG. 11.

The second server device 20 selects a meal plan and a recipe in response to the message requesting for a meal plan and a recipe that is received from the refrigerator 100 (operation 1350).

The second server device 20 may receive a list of foods (or food ingredients) from the refrigerator 100 and obtain the connection information of the refrigerator 100 from the first server device 10. The connection information of the refrigerator 100 may include the identification information and heating method of the cooking device 70 connected to the same AP as the refrigerator 100. In other words, the connection information of the refrigerator 100 may include the identification information and heating method of the cooking device 70 that can be controlled by the refrigerator 100.

The second server device 20 may create a meal plan based on the list of foods (or food ingredients) and preferences information and may select a recipe for foods based on the connection information of the refrigerator 100.

The second server device 20 may select a recipe for foods included in the meal plan based on the heating method of the cooking device 70 connected to the refrigerator 100.

For example, when the cooking device 70 connected to the refrigerator 100 includes a gas oven (or an electric oven), the second server device 20 may select a food recipe in which food can be cooked using the oven. Also, when the cooking device 70 includes broiling, the second server device 20 may select a food recipe that includes heating by broiling.

The second server device 20 sends information on the meal plan and recipe therefor to the refrigerator 100 (operation 1355). In response to receiving the information on the meal plan and recipe therefor from the second server device 20, the refrigerator 100 displays the meal plan and recipe therefor (operation 1360).

The descriptions of the operation 1355 and operation 1360 may be substituted with the above descriptions of the operation 1155 and operation 1160 illustrated in FIG. 10.

In this way, the refrigerator 100 may obtain information on the cooking device 70 connected to the refrigerator 100 and provide a meal plan and a recipe therefor based on the information on the cooking device 70 to the user.

Figure 13:
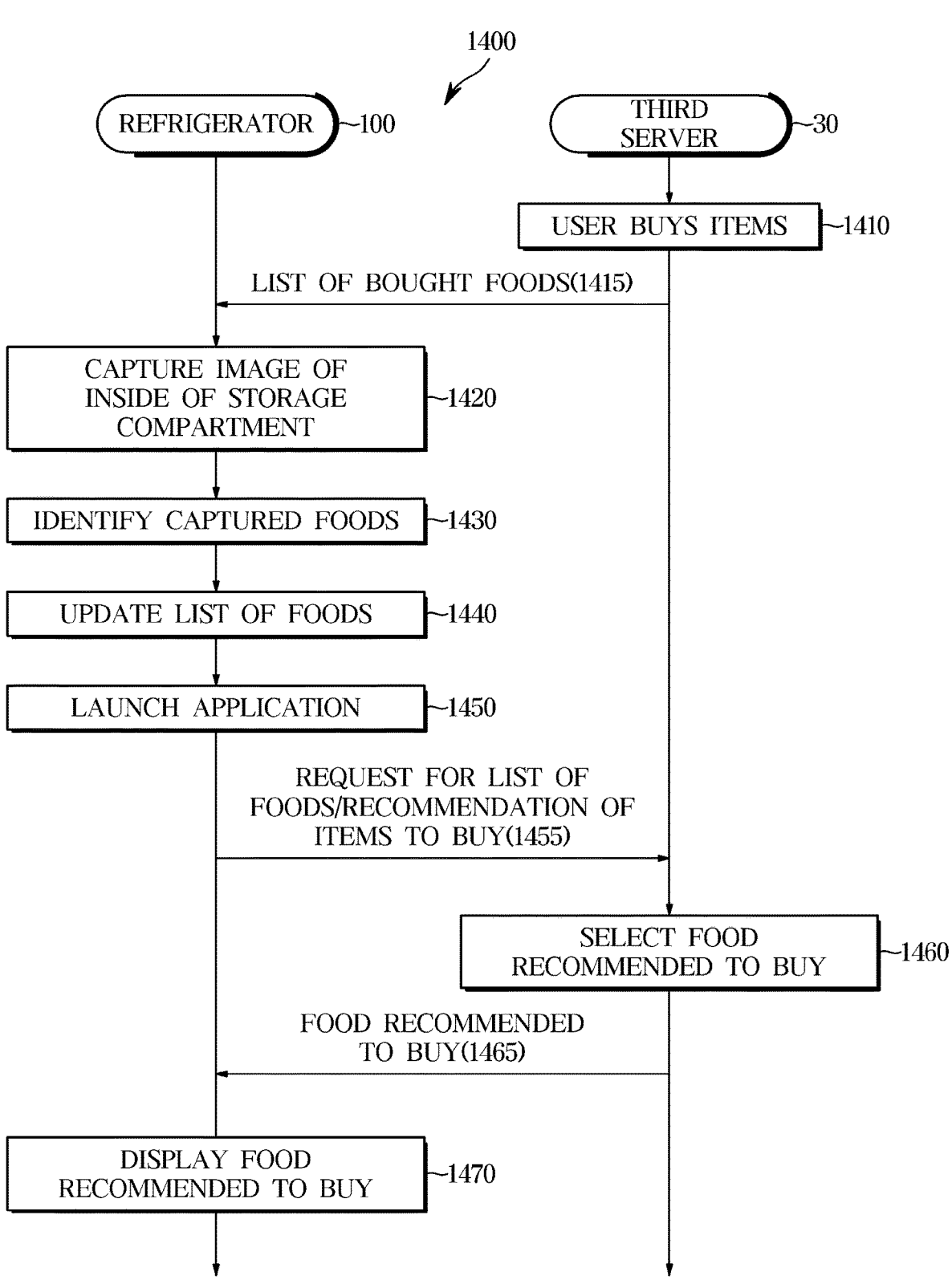
FIG. 13 illustrates one example in which a refrigerator recommends buying of an item according to an embodiment of the disclosure.

FIG. 13 illustrates one example in which a refrigerator recommends buying of an item according to an embodiment of the disclosure.

Referring to FIG. 13, a method (1400) by which the refrigerator recommends buying of an item will be described.

In the third server device 30, buying of items is performed by a user (operation 1410).

The user may directly buy items from a mart connected to the third server device 30, buy items in the third server device 30 through the refrigerator 100, buy items in the third server device 30 through the user device 50, or buy items in the third server device 30 through the display device 60.

The third server device 30 may obtain a list of items bought by the user and store the list of items bought by the user.

The third server device 30 sends a list of bought foods to the refrigerator 100 (operation 1415).

The third server device 30 may send the list of bought foods to the refrigerator 100 based on item delivery information. For example, the third server device 30 may send the list of bought foods to the refrigerator 100 when a message indicating completion of delivery of items is received from a server of a delivery company that has delivered the items. As another example, the third server device 30 may send the list of bought foods to the refrigerator 100 when a delivery prediction time based on a destination of the user passes after the start of delivery of the items. As another example, the third server device 30 may send the list of bought foods to the refrigerator 100 when a predetermined delivery prediction time passes.

In this way, the refrigerator 100 may receive the list of bought foods from the third server device 30 at a time later than the time the user has actually bought the items.

Then, the refrigerator 100 captures an image of the inside of the storage compartment 110 (operation 1420), identifies foods (or food ingredients) captured by the camera 150 (operation 1430), and updates the list of foods (operation 1440).

For example, the controller 190 may control the camera 150 to capture an image of the inside of the storage compartment 110 when closing of the door 120 in an open state is detected. The controller 190 may obtain the image data of the storage compartment 110 from the camera 150.

While the door 120 is open, some of the bought items may be put in the storage compartment 110 in order to be refrigerated and stored. Also, the remaining bought items may be stored at room temperature without being put in the storage compartment 110 of the refrigerator 100. Also, some foods may not be captured by the camera 150 despite having been put in the storage compartment 110.

The controller 190 may update the list of foods based on the previous list of foods, the list of foods identified from the image data of the storage compartment 110, and the list of foods included in the shopping list received from the third server device 30. For example, the controller 190 may compare the list of foods identified from the image data with the list of foods included in the shopping list and may add foods, which are included in the shopping list but not included in the list identified from the image data, to the list of foods. As another example, the controller 190 may update the list of foods only depending on the list of foods identified from the image data. As another example, the controller 190 may update the list of foods by adding the list of foods included in the shopping list to the previous list of foods.

Then, the refrigerator 100 launches an application in response to a user input (operation 1450).

The description of the operation 1450 may be substituted with the above description of the operation 1140 illustrated in FIG. 10.

The refrigerator 100 requests the third server device 30 for a recommendation of items to buy (operation 1455).

The controller 190 may, according to instructions constituting the launched application, control the communication device 180 to send a message that requests the third server device 30 for a recommendation of items to buy, in addition to the list of the foods (or food ingredients).

The third server device 30 selects an item recommended to buy in response to the message requesting for a recommendation of items to buy that is received from the refrigerator 100 (operation 1460).

The third server device 30 may select an item recommended to buy based on a purchase record of a user that is pre-stored and the list of foods (or food ingredients) that is received from the refrigerator 100.

For example, the third server device 30 may compare a list of foods according to the user's purchase record and the list of foods received from the refrigerator 100 and may select food included in the list of foods according to the user's purchase record but not included in the list of foods received from the refrigerator 100. As another example, the third server device 30 may select an item that the user has recently bought two times or more in a row.

The third server device 30 sends information on the item recommended to buy to the refrigerator 100 (operation 1465).

The refrigerator 100 displays the item recommended to buy, in response to receiving the information on the item recommended to buy from the third server device 30 (operation 1470).

The controller 190 may, according to instructions constituting the launched application, control the touchscreen display 130 to display the item recommended to buy received from the third server device 30. For example, the controller 190 may control the touchscreen display 130 to display the page 300 including the shopping list area 330 as illustrated in FIG. 7. The item recommended to buy received from the third server device 30 may be displayed in the shopping list area 330. Further, the controller 190 may control the touchscreen display 130 to display the page 301 including the meal plan area 310 and the recipe area 320 as illustrated in FIG. 8.

In this way, the refrigerator 100 may provide a recommendation of items to buy to the user based on the user's item purchase record and foods (or food ingredients) stored in the storage compartment 110.

Figure 14:
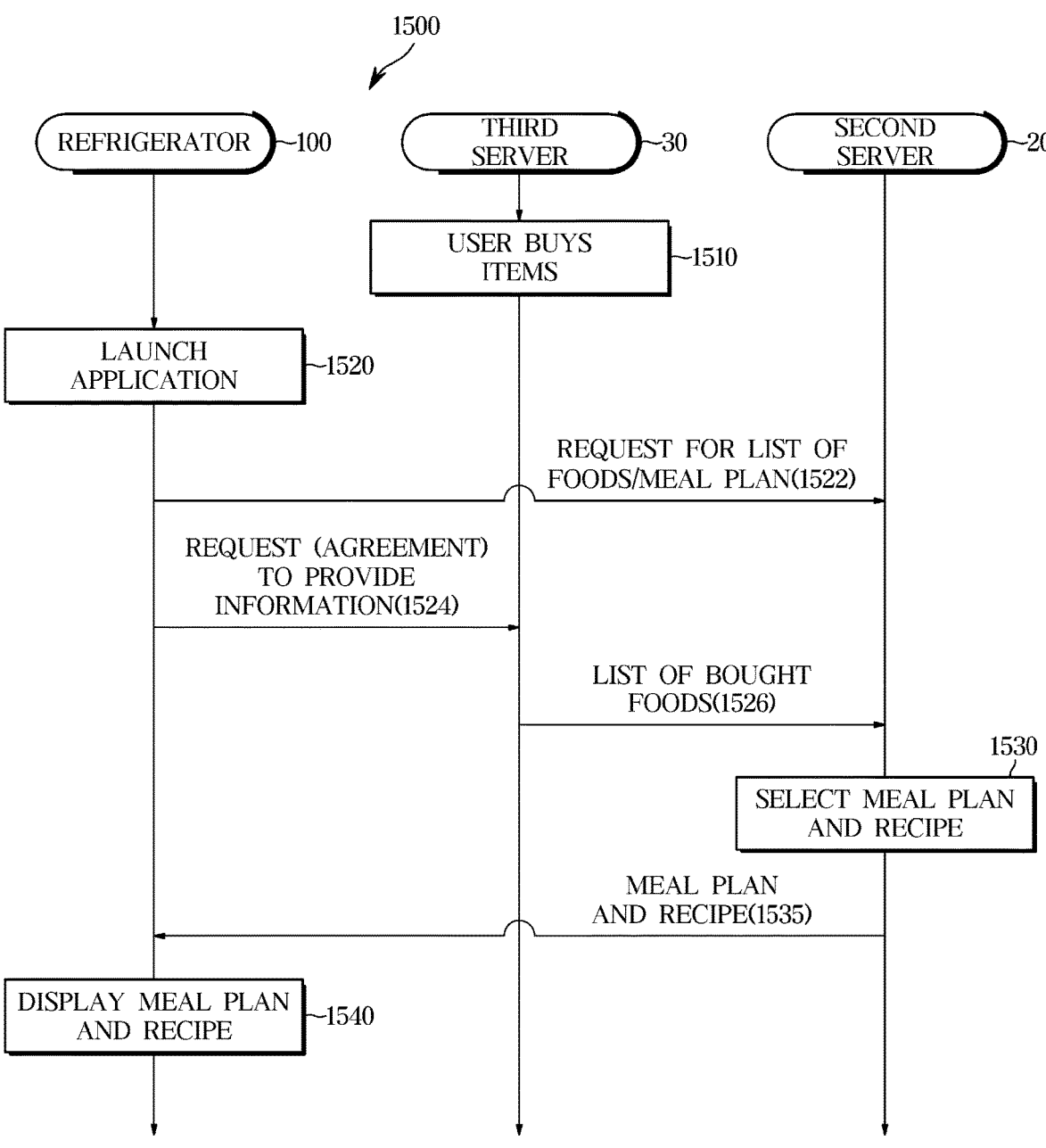
FIG. 14 illustrates one example in which a refrigerator obtains a meal plan and/or a recipe according to an embodiment of the disclosure.

FIG. 14 illustrates one example in which a refrigerator obtains a meal plan and/or a recipe according to an embodiment of the disclosure.

Referring to FIG. 14, a method (1500) by which the refrigerator obtains a meal plan and/or a recipe therefor will be described.

In the third server device 30, buying of items is performed by a user (operation 1510).

The description of the operation 1510 may be substituted with the above description of the operation 1410 illustrated in FIG. 13.

The refrigerator 100 launches an application in response to a user input (1520).

Before the refrigerator 100 receives a shopping list from the third server device 30 or before the user receives bought items, the controller 190 may obtain a user input to launch an application through the touchscreen display 130. The controller 190 may launch the application in response to the user input.

The refrigerator 100 requests the second server device 20 for a meal plan and a recipe (operation 1522).

The description of the operation 1522 may be substituted with the above description of the operation 1145 illustrated in FIG. 10.

The refrigerator 100 sends, to the third server device 30, a message requesting for provision of a recent shopping list or a message agreeing to the request for the provision of the recent shopping list received from the third server device 30 (operation 1524). In response to the message from the refrigerator 100, the third server device 30 sends the recent shopping list of the user to the second server device 20 (operation 1526).

In order to provide a meal plan and a recipe that are suitable for the user's taste, the second server device 20 may request the third server device 30 or the refrigerator 100 for a food shopping list.

The refrigerator 100 may, in response to the request of the second server device 20 for the information, obtain a user input agreeing to provide the food shopping list and send a message agreeing to provide the food shopping list to the third server device 30. Also, the third server device 30 may, in response to the request of the second server device 20 for the information, request the refrigerator 100 for agreement to provide the food shopping list. The refrigerator 100 may obtain the user input agreeing to provide the food shopping list and send the message agreeing to provide the food shopping list to the third server device 30.

The third server device 30 may, in response to the message from the refrigerator 100, send the recent shopping list to the second server device 20.

The second server device 20 selects a meal plan and a recipe in response to the message requesting for a meal plan and a recipe that is received from the refrigerator 100 (operation 1530).

The second server device 20 may create a meal plan based on the list of foods (or food ingredients) stored in the refrigerator 100 and the list of bought foods (or food ingredients) bought by the user and may select a recipe for the foods included in the meal plan. The second server device 20 may, by combining the list of foods (or food ingredients) stored in the refrigerator 100 and the list of bought foods (or food ingredients) bought by the user, create a list of foods (or food ingredients) that may be used to cook according to a meal plan, may create a meal plan based on the created list of foods (or food ingredients), and may select a recipe for the foods included in the meal plan.

The second server device 20 sends information on the meal plan and recipe therefor to the refrigerator 100 (operation 1535). In response to receiving the information on the meal plan and recipe therefor from the second server device 20, the refrigerator 100 displays the meal plan and recipe therefor (operation 1540).

The descriptions of the operation 1535 and operation 1540 may be substituted with the above descriptions of the operation 1155 and operation 1160 illustrated in FIG. 10.

In this way, the refrigerator 100 may, as soon as foods (or food ingredients) are bought, provide a meal plan and a recipe therefor based on the bought foods (or food ingredients) to the user.

Figure 15:
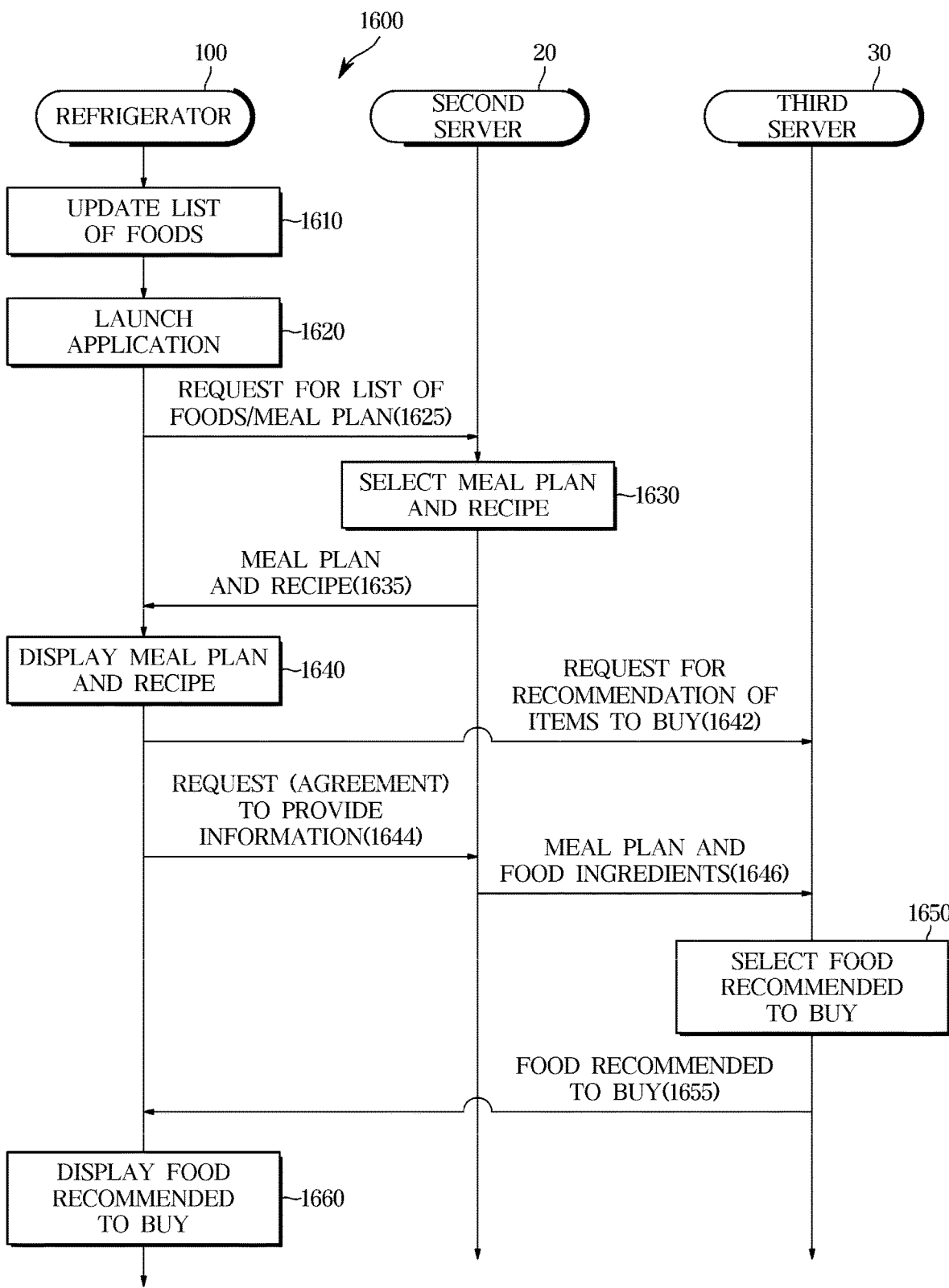
FIG. 15 illustrates one example in which a refrigerator obtains a meal plan and/or a recipe and recommends buying of an item according to an embodiment of the disclosure.

FIG. 15 illustrates one example in which a refrigerator obtains a meal plan and/or a recipe and recommends buying of an item according to an embodiment of the disclosure.

Referring to FIG. 15, a method (1600) by which the refrigerator obtains a meal plan and/or a recipe and recommends buying of an item will be described.

The refrigerator 100 updates a list of foods stored in the storage compartment 110 (operation 1610).

The description of the operation 1610 may be substituted with the above descriptions of the operation 1110, operation 1120, and operation 1130 illustrated in FIG. 10.

The refrigerator 100 launches an application in response to a user input (operation 1620).

The description of the operation 1620 may be substituted with the above description of the operation 1140 illustrated in FIG. 10.

The refrigerator 100 requests the second server device 20 for a meal plan and a recipe (operation 1625).

The description of the operation 1625 may be substituted with the above description of the operation 1145 illustrated in FIG. 10.

The second server device 20 selects a meal plan and a recipe in response to a message requesting for a meal plan and a recipe that is received from the refrigerator 100 (operation 1630).

The description of the operation 1630 may be substituted with the above description of the operation 1020 illustrated in FIG. 9 and/or description of the operation 1150 illustrated in FIG. 10 and/or description of the operation 1250 illustrated in FIG. 11 and/or description of the operation 1350 illustrated in FIG. 12 and/or description of the operation 1530 illustrated in FIG. 14.

The second server device 20 sends information on the meal plan and recipe therefor to the refrigerator 100 (operation 1635). In response to receiving the information on the meal plan and recipe therefor from the second server device 20, the refrigerator 100 displays the meal plan and recipe therefor (operation 1640).

The descriptions of the operation 1635 and operation 1640 may be substituted with the above descriptions of the operation 1155 and operation 1160 illustrated in FIG. 10.

The refrigerator 100 requests the third server device 30 for a recommendation of items to buy (operation 1642).

The description of the operation 1642 may be substituted with the above description of the operation 1455 illustrated in FIG. 13.

The refrigerator 100 sends, to the second server device 20, a message requesting for provision of food ingredients for a recipe for a meal plan or a message agreeing to the request for the provision of the food ingredients for the recipe for the meal plan that is received from the second server device 20 (operation 1644). In response to the message from the refrigerator 100, the second server device 20 sends the information on food ingredients for a recipe for a meal plan to the third server device 30 (operation 1646).

In order to provide a recommendation of items to buy, the third server device 30 may request the second server device 20 or the refrigerator 100 for the information on food ingredients for a recipe for a meal plan.

The refrigerator 100 may, in response to the request of the third server device 30 for the information, obtain a user input agreeing to provide the information and send a message agreeing to provide the information to the second server device 20. Also, the second server device 20 may, in response to the request of the third server device 30 for the information, request the refrigerator 100 for agreement to provide the information. The refrigerator 100 may obtain the user input agreeing to provide the information and send the message agreeing to provide the information to the second server device 20.

The second server device 20 may, in response to the message from the refrigerator 100, send the information on the food ingredients for the recipe for the meal plan to the third server device 30.

The third server device 30 selects an item recommended to buy, in response to the message requesting for a recommendation of items to buy that is received from the refrigerator 100 (operation 1650).

The third server device 30 may select an item recommended to buy based on a purchase record of a user that is pre-stored, the list of foods (or food ingredients) that is received from the refrigerator 100, and food ingredients for a recipe for a meal plan. For example, the third server device 30 may select the food ingredients for the recipe for the meal plan and foods included in the list of foods according to the user's purchase record but not included in the list of foods received from the refrigerator 100.

The third server device 30 sends information on the item recommended to buy to the refrigerator 100 (operation 1655).

The refrigerator 100 displays the item recommended to buy, in response to receiving the information on the item recommended to buy from the third server device 30 (operation 1660).

The descriptions of the operation 1655 and operation 1660 may be substituted with the descriptions of the operation 1465 and operation 1470 illustrated in FIG. 13.

In this way, the refrigerator 100 may provide a meal plan and a recipe therefor to the user and provide a recommendation of items to buy based on the meal plan and recipe therefor to the user.

Figure 16:
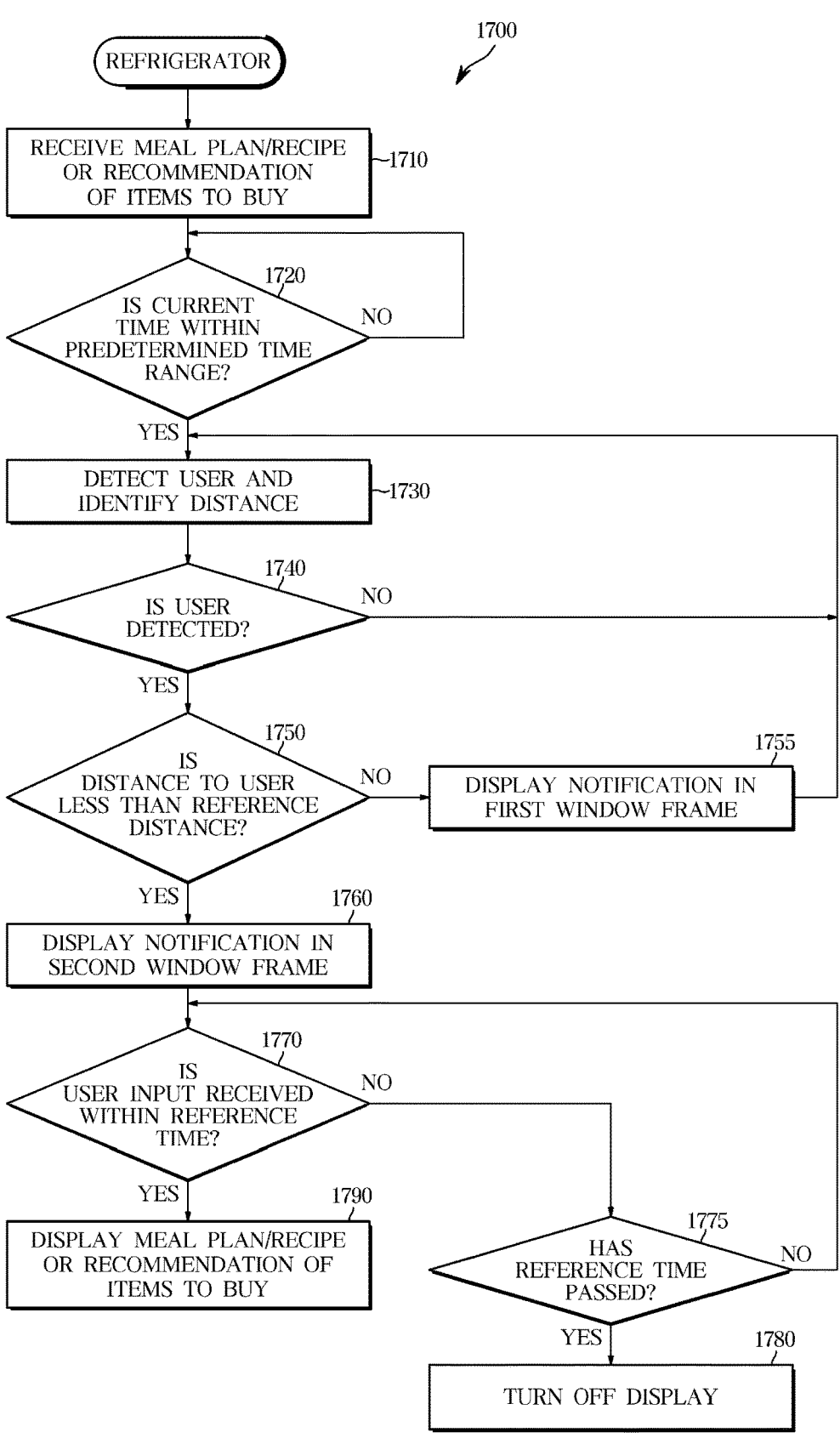
FIG. 16 illustrates one example in which a refrigerator provides a notification to a user according to an embodiment of the disclosure.

FIG. 16 illustrates one example in which a refrigerator provides a notification to a user according to an embodiment of the disclosure.

Figure 17:
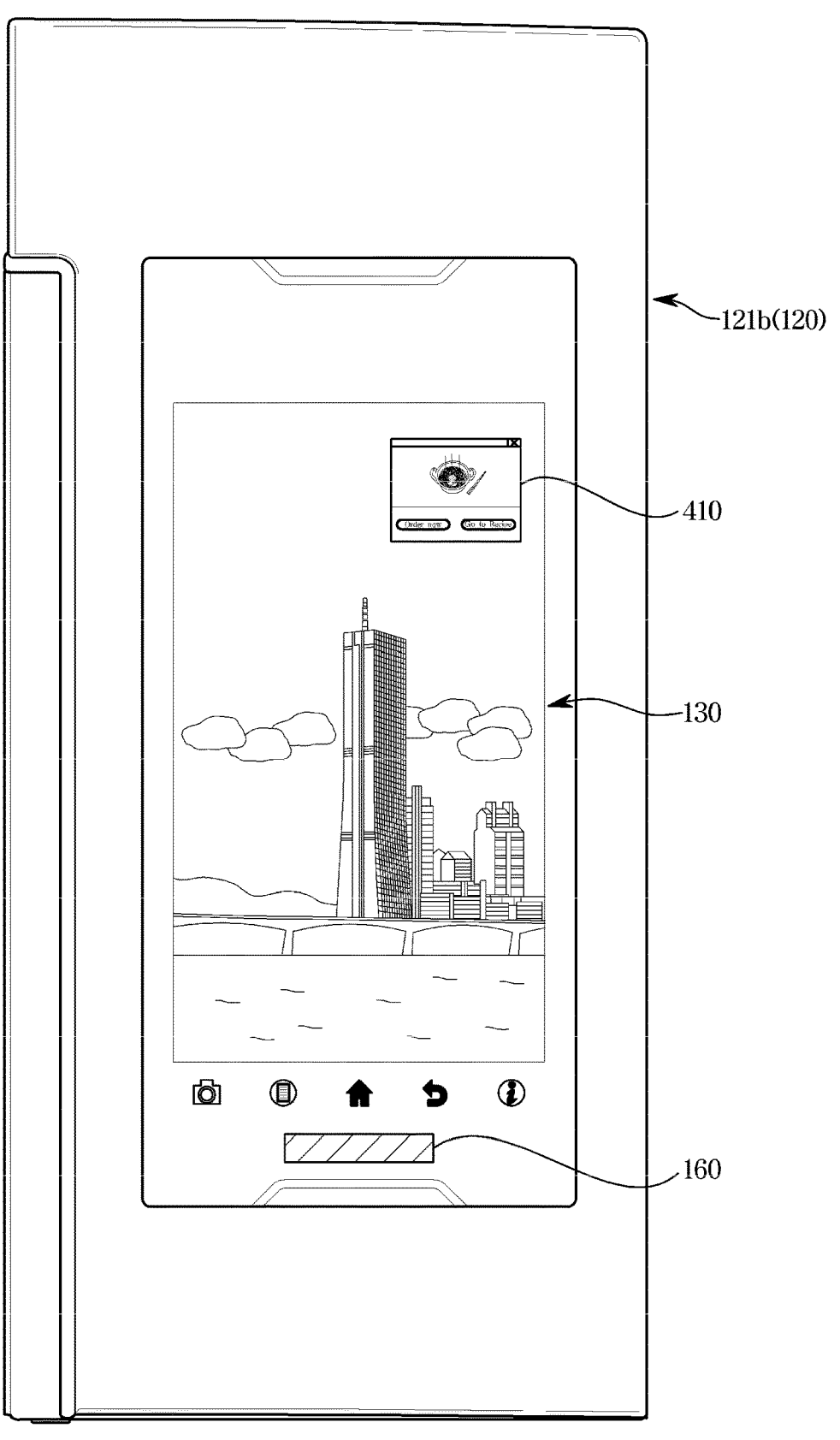
FIG. 17 illustrates one example in which a refrigerator provides a notification to a user through a first window frame according to an embodiment of the disclosure.

FIG. 17 illustrates one example in which a refrigerator provides a notification to a user through a first window frame according to an embodiment of the disclosure.

Figure 18:
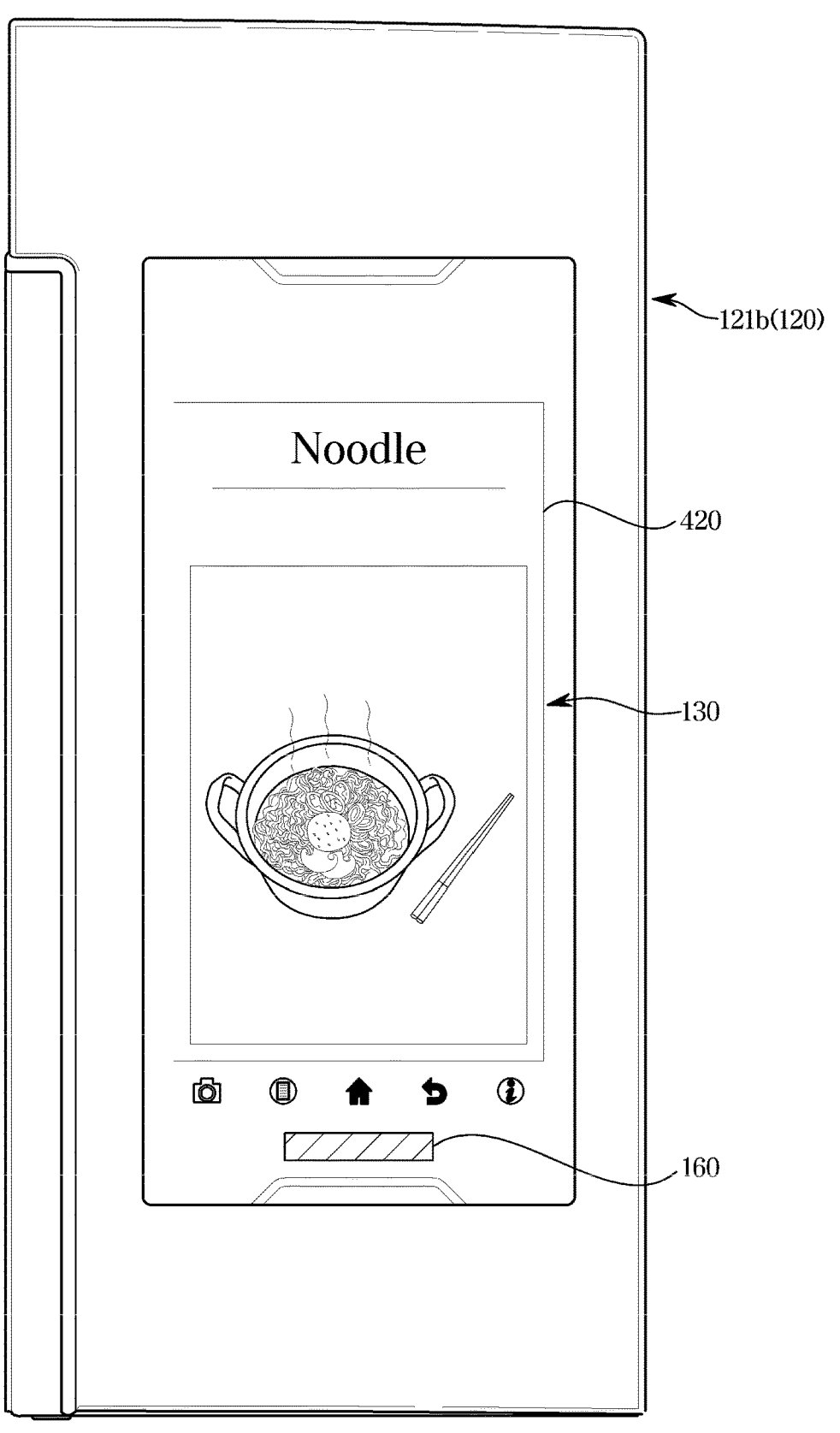
FIG. 18 illustrates one example in which a refrigerator provides a notification to a user through a second window frame according to an embodiment of the disclosure.

FIG. 18 illustrates one example in which a refrigerator provides a notification to a user through a second window frame according to an embodiment of the disclosure.

Figure 19:
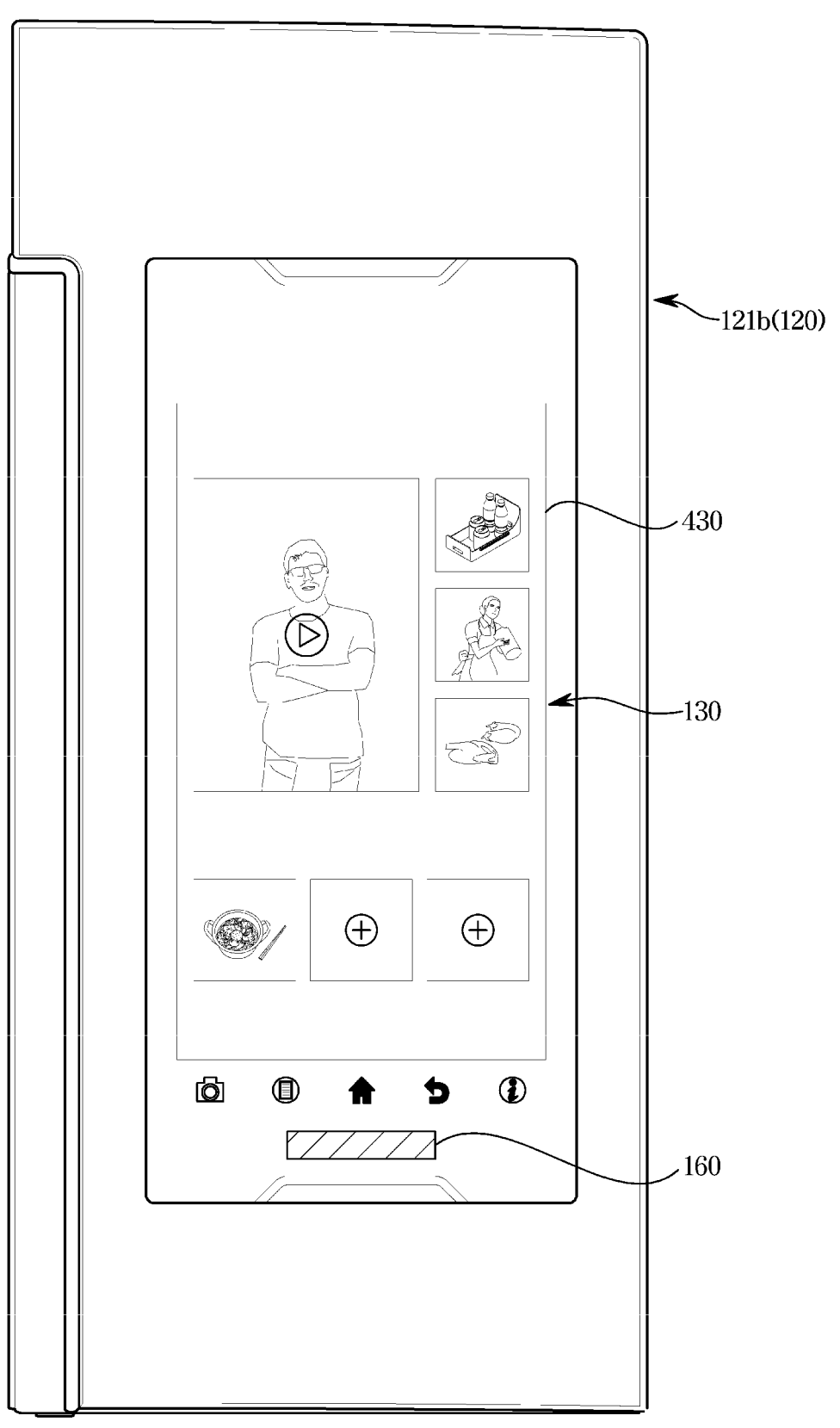
FIG. 19 illustrates one example in which a refrigerator displays a meal plan and/or a recipe according to an embodiment of the disclosure.

FIG. 19 illustrates one example in which a refrigerator displays a meal plan and/or a recipe according to an embodiment of the disclosure.

Referring to FIGS. 16, 17, 18, and 19, a method (1700) by which a refrigerator provides a notification to a user will be described.

The refrigerator 100 receives a meal plan/a recipe or a recommendation of items to buy (operation 1710).

The controller 190 may receive a meal plan/a recipe from the second server device 20 or receive a recommendation of foods to buy from the third server device 30 through the communication device 180.

The reception of the meal plan/recipe or the recommendation of items to buy may be performed by any one of the method (1000), method (1100), method (1200), method (1300), method (1400), method (1500), and method (1600) described above.

The refrigerator 100 identifies whether the current time is within a predetermined time range (operation 1720).

For convenience of a user, the refrigerator 100 may provide a notification to the user in a predetermined time slot. For example, the refrigerator 100 may provide a notification related to a meal plan/a recipe in a time slot during which the user prepares a meal and may provide a notification related to a recommendation of items to buy in a time slot during which the user is at home. Also, the refrigerator 100 may prevent a notification late into the night or at the early dawn.

In a case in which the current time is not within the predetermined time range (NO in operation 1720), the refrigerator 100 may wait instead of providing a notification.

In a case in which the current time is within the predetermined time range (YES in operation 1720), the refrigerator 100 detects a user and identifies a distance to the user (operation 1730).

The controller 190 may control the range sensor 160 to detect the user and obtain information on the distance to the user.

An example of the range sensor 160 may include an infrared transceiver, an ultrasonic transceiver, or a transceiving antenna. The range sensor 160 may transmit infrared rays, ultrasonic waves, or radio waves toward a front of the refrigerator 100 and may receive the infrared rays, ultrasonic waves, or radio waves reflected from a user or an object.

The presence or absence of the user may be identified based on the infrared rays, ultrasonic waves, or radio waves reflected from the user. Also, the distance to the user may be identified based on a time of flight (TOF) of the infrared rays, ultrasonic waves, or radio waves or may be identified based on an intensity of the received infrared rays, ultrasonic waves, or radio waves.

The range sensor 160 may provide an electrical signal indicating whether the user is detected and the distance to the user to the controller 190. For example, the range sensor 160 may provide detected data indicating that the user is not detected or provide detected data indicating the distance to the user. Specifically, the range sensor 160 may provide detected data indicating the TOF of the infrared rays, ultrasonic waves, or radio waves to the controller 190 or may provide detected data indicating the intensity of the received infrared rays, ultrasonic waves, or radio waves to the controller 190.

The controller 190 may receive detected data from the range sensor 160 and may, based on the received detected data, identify whether the user is detected from the refrigerator 100 and the distance from the refrigerator 100 to the user.

The refrigerator 100 identifies whether the user is detected (operation 1740).

The controller 190 may, based on the detected data received from the range sensor 160, identify whether the user is located around the refrigerator 100.

For example, the range sensor 160 may provide detected data indicating non-detection of the user to the controller 190 in response to the user not being detected and may provide detected data indicating the distance to the user to the controller 190 in response to the user being detected.

The controller 190 may, based on the detected data indicating non-detection of the user, identify that the user is not located around the refrigerator 100 and may, based on the detected data indicating the distance to the user, identify that the user is located around the refrigerator 100.

In a case in which the user is not detected (NO in operation 1740), the refrigerator 100 detects the user and identifies the distance to the user (operation 1730).

In a case in which the user is detected (YES in operation 1740), the refrigerator 100 identifies whether the distance to the user is less than a reference distance (operation 1750).

The controller 190 may identify the distance to the user based on the detected data received from the range sensor 160. Also, the controller 190 may identify whether the distance to the user is less than the reference distance.

For example, the controller 190 may compare a physical quantity (for example, a voltage value) indicating the distance to the user with a physical quantity (for example, a voltage value) indicating a predetermined reference distance and may, based on the comparison, identify whether the distance to the user is less than the reference distance.

Here, for example, the reference distance may be set empirically or experimentally and may be set as a distance that allows the user to check content displayed on the refrigerator 100.

In a case in which the distance to the user is not less than the reference distance (NO in operation 1750), the refrigerator 100 displays a notification in a first window frame 410 (operation 1755).

The controller 190 may display a notification indicating reception of a meal plan/a recipe or a recommendation of items to buy in the first window frame 410 in order to call the user's attention. For example, the controller 190 may control the touchscreen display 130 to display a notification in the first window frame 410 which is in the form of a popup window smaller than a screen of the touchscreen display 130 as illustrated in FIG. 17. However, the first window frame 410 is not limited to the popup window illustrated in FIG. 17.

Due to the first window frame 410 in the form of the popup window, the user may recognize that a notification is received and may approach the refrigerator 100 in order to check the content of the notification.

In a case in which the distance to the user is less than the reference distance (YES in operation 1750), the refrigerator 100 displays a notification in a second window frame 420 (operation 1760).

The controller 190 may display a notification indicating reception of a meal plan/a recipe or a recommendation of items to buy in the second window frame 420 in order to provide the content of the notification to the user. The second window frame 420 may be larger than the first window frame 410. For example, a diagonal length of the second window frame 420 may be greater than a diagonal length of the first window frame 410.

For example, the controller 190 may control the touchscreen display 130 to display a notification in the second window frame 420 which is in the form of a cover page substantially the same as the screen of the touchscreen display 130 as illustrated in FIG. 18. However, the second window frame 420 is not limited to the cover page illustrated in FIG. 18.

Due to the second window frame 420 in the form of the cover page, the user may check the content of the received notification (that is, reception of the meal plan/recipe or the recommendation of items to buy).

The refrigerator 100 identifies whether a user input is received through the touchscreen display 130 (operation 1770).

While the notification indicating the reception of the meal plan/recipe or the recommendation of items to buy is displayed, the controller 190 may identify whether a user input is received through the touchscreen display 130.

The user input includes a touch input through the touchscreen display 130. However, the user input is not limited to a touch input on specific coordinates, a touch input of a specific pattern, or a touch input by a specific gesture, and just a touch on the touchscreen display 130 may be sufficient.

In a case in which a user input is not received through the touchscreen display 130 (NO in operation 1770), the refrigerator 100 identifies whether a reference time has passed after the notification is displayed in the second window frame 420 (operation 1775).

Using a timer therein, the controller 190 may count a display time during which the notification has been displayed in the second window frame 420. The controller 190 may compare the display time with the reference time and identify whether the display time of the notification is greater than the reference time.

In a case in which the reference time has not passed after the notification is displayed (NO in operation 1775), the refrigerator 100 identifies whether a user input is received through the touchscreen display 130 (operation 1770) and identifies whether the reference time has passed after the notification is displayed in the second window frame 420 (operation 1775).

In a case in which the reference time has passed after the notification is displayed (YES in operation 1775), the refrigerator 100 turns off the touchscreen display 130 (operation 1780).

A user input not being made during the reference time may be determined as indicating that the user has no intention to check the notification of the refrigerator 100.

The controller 190 may turn off the touchscreen display 130 in response to a user input not being made during the reference time.

In a case in which a user input is received through the touchscreen display 130 (YES in operation 1770), the refrigerator 100 displays the meal plan/recipe or the recommendation of items to buy on the touchscreen display 130 (operation 1790).

A user input being made may be determined as indicating that the user has an intention to check the notification of the refrigerator 100.

The controller 190 may, in response to a user input through the touchscreen display 130, display the meal plan and recipe therefor received from the second server device 20 on the touchscreen display 130 or display the food recommended to buy received from the third server device 30 on the touchscreen display 130. For example, the controller 190 may display content indicating the meal plan and recipe therefor on the entire screen 430 of the touchscreen display 130 as illustrated in FIG. 19.

In this way, the refrigerator 100 may display a notification of a meal plan/a recipe or a recommendation of items to buy in various ways according to a situation of the user. Accordingly, the user may easily recognize a notification of a meal plan/a recipe or a recommendation of items to buy and receive the content of the meal plan/recipe or the content of the recommendation of items to buy.

Figure 20:
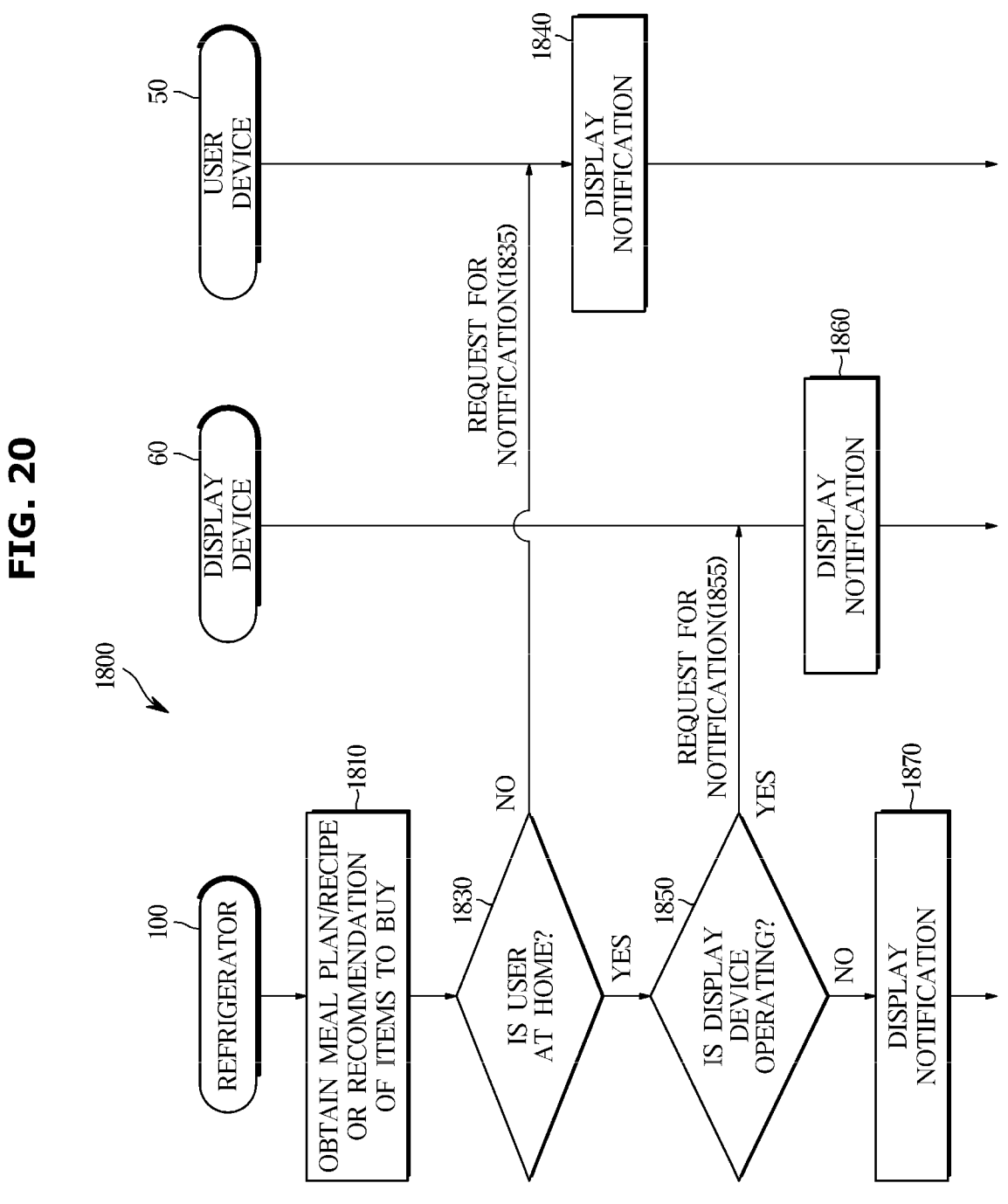
FIG. 20 illustrates one example in which a refrigerator provides a notification to a user according to an embodiment of the disclosure.

FIG. 20 illustrates one example in which a refrigerator provides a notification to a user according to an embodiment of the disclosure.

Figure 21:
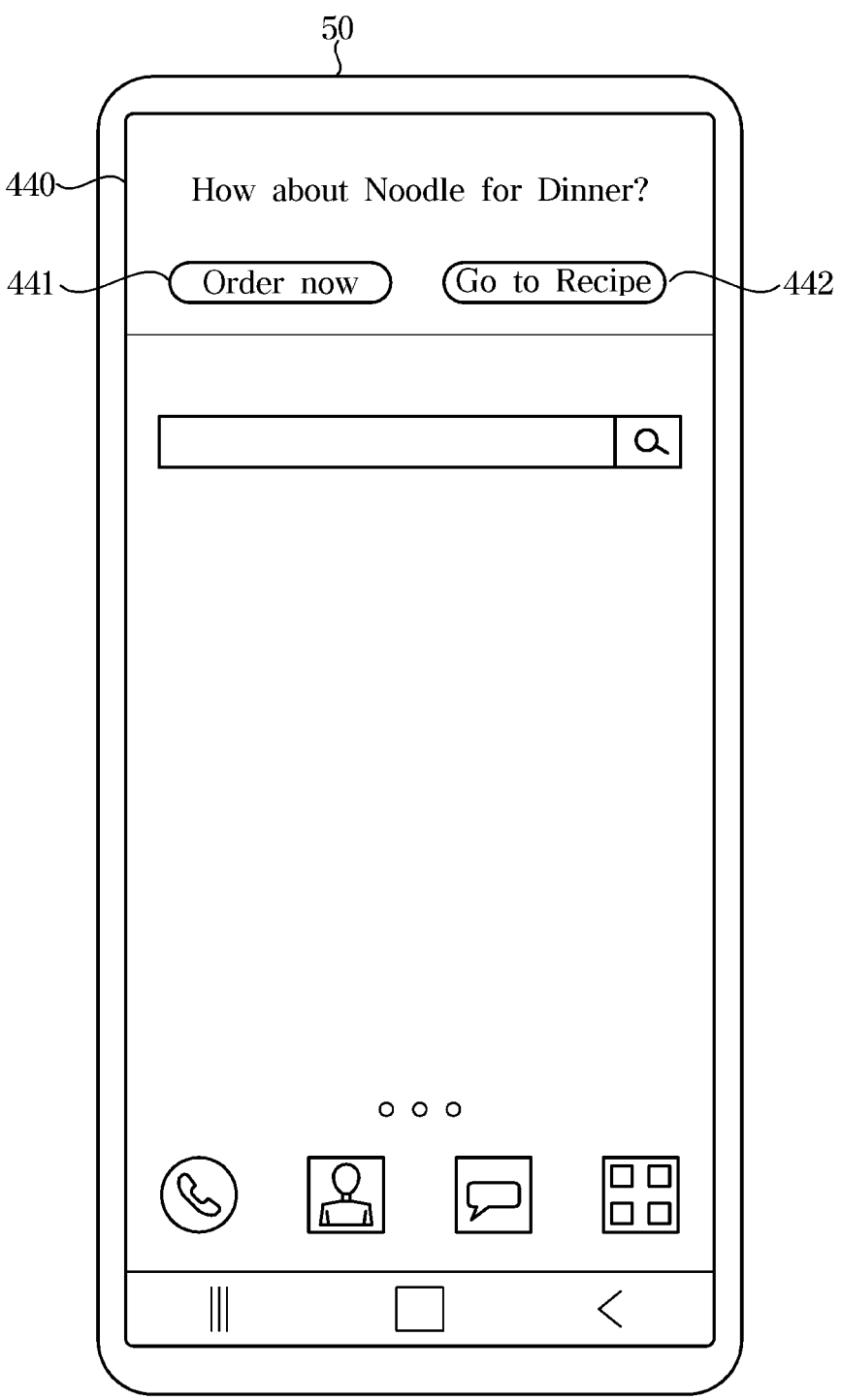
FIG. 21 illustrates one example in which a refrigerator provides a notification to a user through a user device according to an embodiment of the disclosure.

FIG. 21 illustrates one example in which a refrigerator provides a notification to a user through a user device according to an embodiment of the disclosure.

Figure 22:
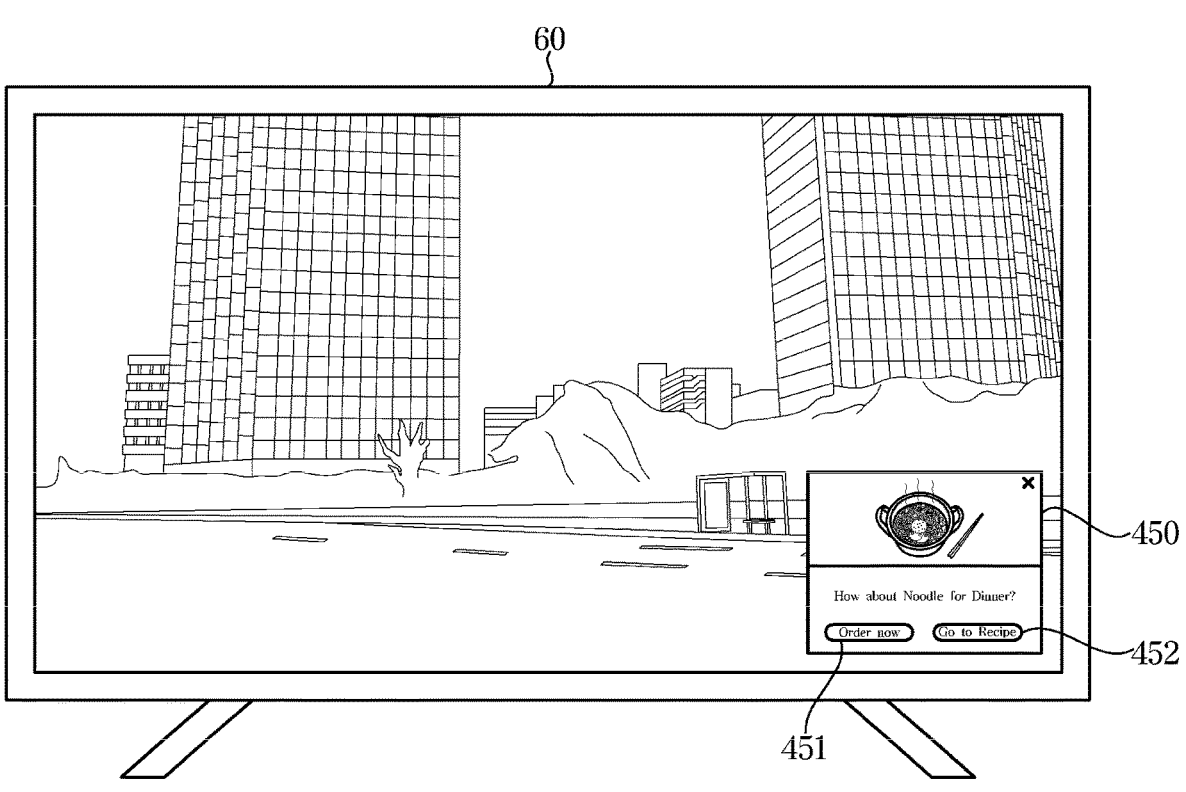
FIG. 22 illustrates one example in which a refrigerator provides a notification to a user through a display device according to an embodiment of the disclosure.

FIG. 22 illustrates one example in which a refrigerator provides a notification to a user through a display device according to an embodiment of the disclosure.

Referring to FIGS. 20, 21, and 22, a method (1800) by which the refrigerator provides a notification to a user will be described.

The refrigerator 100 receives a meal plan/a recipe or a recommendation of items to buy (operation 1810).

The controller 190 may receive a meal plan/a recipe from the second server device 20 or receive a recommendation of foods to buy from the third server device 30 through the communication device 180.

The reception of the meal plan/recipe or the recommendation of items to buy may be performed by any one of the method (1000), method (1100), method (1200), method (1300), method (1400), method (1500), and method (1600) described above.

The refrigerator 100 identifies whether a user is at home (operation 1830).

The controller 190 may identify whether a user is at home based on various pieces of information. Here, the home may generally indicate a predetermined area where the user resides.

For example, the controller 190 may identify whether a user is at home based on whether the user device 50 of the user is connected to the same AP as the refrigerator 100. The controller 190 may request the AP or the first server device 10 for connection information of the user device 50 and may, based on a response from the AP or the first server device 10, identify whether the user device 50 is connected to the AP. In response to identifying that the user device 50 is connected to the AP, the controller 190 may identify that the user is at home.

As another example, the controller 190 may identify whether a user is at home based on whether the display device 60 operates. The controller 190 may request the display device 60 for a reply signal through the AP or the first server device 10. The controller 190 may identify whether the display device 60 operates based on the replay signal received from the display device 60. In response to identifying that the display device 60 is operating, the controller 190 may identify that the user is at home.

As another example, the controller 190 may request the first server device 10 for a position of the user device 50 and may, based on a response from the first server device 10, identify whether the user is at home. The first server device 10 may track the position of the user device 50 and may, in response to the request from the refrigerator 100, provide position information of the user device 50 to the refrigerator 100.

In a case in which a user is not at home (NO in operation 1830), the refrigerator 100 requests the user device 50 for a notification of reception of a meal plan/a recipe or a recommendation of items to buy (operation 1835).

The controller 190 may control the communication device 180 to send a message requesting for the notification of the user device 50 to the first server device 10. The first server device 10 stores information on devices linked to the user's account, for example, the refrigerator 100, the user device 50, the display device 60, and the cooking device 70. Accordingly, the controller 190 may send a message requesting for a notification of reception of a meal plan/a recipe or a recommendation of items to buy to the user device 50 through the first server device 10.

In response to the request from the refrigerator 100, the user device 50 displays the notification of the reception of the meal plan/recipe or the recommendation of items to buy (operation 1840).

The user device 50 may receive the request from the refrigerator 100 through the first server device 10 and may display the notification of the reception of the meal plan/recipe or the recommendation of items to buy on a display.

Referring to FIG. 21, the user device 50 may display a notification window 440 on the display and may display a message indicating reception of a meal plan/a recipe or a recommendation of items to buy in the notification window 440. Also, in the notification window 440, a buying button 441 to run an application through which an item recommended to buy can be bought and a checking button 442 to run an application through which the meal plan and recipe therefor can be checked may be provided.

In a case in which the user is at home (YES in operation 1830), the refrigerator 100 identifies whether the display device 60 is operating (operation 1850).

The controller 190 may request the display device 60 for a reply signal through the AP or the first server device 10. The operating display device 60 may provide a reply signal in response to the request from the refrigerator 100.

The controller 190 may, based on whether the reply signal is received from the display device 60, identify whether the display device 60 is operating.

Further, the controller 190 may obtain information on a time during which the user views the display device 60 from the first server device 10. The first server device 10 may collect information on an operation time of the display device 60 and may provide the information on the operation time of the display device 60 to the refrigerator 100. Based on the information on the operation time of the display device 60, the controller 190 may identify whether the display device 60 is currently operating.

In a case in which the display device 60 is operating (YES in 1850), the refrigerator 100 requests the display device 60 for a notification of reception of a meal plan/a recipe or a recommendation of items to buy (operation 1855).

The controller 190 may control the communication device 180 to send a message requesting for the notification of the display device 60 to the first server device 10. The first server device 10 stores information on devices linked to the user's account, for example, the refrigerator 100, the user device 50, the display device 60, and the cooking device 70. Accordingly, the controller 190 may send a message requesting for a notification of reception of a meal plan/a recipe or a recommendation of items to buy to the display device 60 through the first server device 10.

Further, the controller 190 may send a message requesting for a notification of reception of a meal plan/a recipe or a recommendation of items to buy to the display device 60 through the AP.

In response to the request from the refrigerator 100, the display device 60 displays the notification of the reception of the meal plan/recipe or the recommendation of items to buy (operation 1860).

The display device 60 may receive the request from the refrigerator 100 through the first server device 10 or the AP and may display the notification of the reception of the meal plan/recipe or the recommendation of items to buy on a display.

For example, as illustrated in FIG. 22, the display device 60 may display a notification window 450 on the display and may display a message indicating reception of a meal plan/a recipe or a recommendation of items to buy in the notification window 450. Also, in the notification window 450, a buying button 451 to run an application through which an item recommended to buy can be bought and a checking button 452 to run an application through which the meal plan and recipe therefor can be checked may be provided.

In a case in which the display device 60 is not operating (NO in operation 1850), the refrigerator 100 displays the notification of the reception of the meal plan/recipe or the recommendation of items to buy (operation 1870).

The operation 1870 may be the same as the method (operation 1700) illustrated in FIG. 16.

Based on the distance between the refrigerator 100 and the user, the controller 190 may control the touchscreen display 130 to display the notification of the reception of the meal plan/recipe or the recommendation of items to buy in the first window frame 410 or the second window frame 420.

In this way, the refrigerator 100 may request various devices to display a notification of a meal plan/a recipe or a recommendation of items to buy according to a situation of the user. Accordingly, the user may easily recognize a notification of a meal plan/a recipe or a recommendation of items to buy and receive the content of the meal plan/recipe or the content of the recommendation of items to buy.

Figure 23:
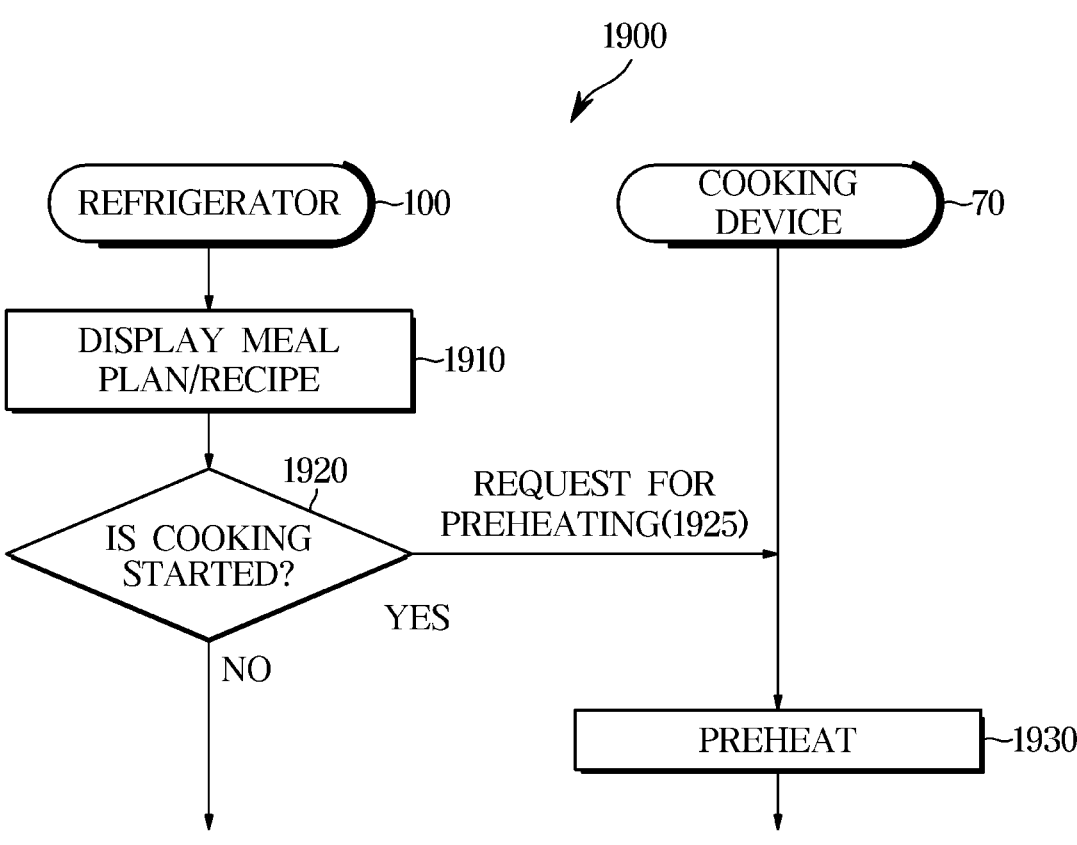
FIG. 23 illustrates one example in which a refrigerator controls a cooking device according to an embodiment of the disclosure.

FIG. 23 illustrates one example in which a refrigerator controls a cooking device according to an embodiment of the disclosure.

Referring to FIG. 23, a method (1900) by which the refrigerator controls a cooking device will be described.

The refrigerator 100 displays a meal plan and a recipe therefor (operation 1910).

The controller 190 may receive a meal plan and a recipe therefor from the second server device 20 through the communication device 180 and control the touchscreen display 130 to display the meal plan and recipe therefor.

The display of the meal plan and recipe therefor may be performed by any one of the method (1000), method (1100), method (1200), method (1300), and method (1500) described above.

The refrigerator 100 identifies whether cooking is started (operation 1920).

The controller 190 may identify whether a user input to start cooking is received.

For example, the first cooking button 311 may be provided in the meal plan area 310 of the page 300 illustrated in FIG. 7, and the second cooking button 321 may be provided in the recipe area 320. The controller 190 may identify a start of cooking in response to a user input through the first cooking button 311 or the second cooking button 321.

In a case in which a start of cooking is not identified (NO in operation 1920), the refrigerator 100 continues to display the meal plan and recipe therefor.

In a case in which a start of cooking is identified (YES in operation 1920), the refrigerator 100 sends a preheating request to the cooking device 70 (operation 1925).

The controller 190 may control the communication device 180 to send a message requesting for preheating to the cooking device 70 through the AP or the first server device 10.

The cooking device 70 that has received the preheating request from the refrigerator 100 performs preheating of the chamber (operation 1930).

The cooking device 70 may use heating such as broiling, grilling, and/or convection in order to preheat the chamber.

In this way, while a meal plan and a recipe therefor are displayed, the refrigerator 100 may control the cooking device 70 to heat food in response to a user input.

A refrigerator according to one embodiment may include: a storage compartment; a camera having a field of view facing the storage compartment; a display; a range sensor; and a controller. The controller may obtain image data of the storage compartment from the camera, identify foods stored in the storage compartment based on the image data, obtain a meal plan based on information on the identified foods, control the display to display a first window frame including a notification regarding the meal plan, in response to a distance to a user being a predetermined reference distance or more based on an output of the range sensor, and control the display to display a second window frame including a notification regarding the meal plan, in response to the distance to the user being less than the reference distance based on the output of the range sensor. The size of the second window frame may be different from the size of the first window frame.

The size of the second window frame may be greater than the size of the first window frame.

The controller may control the display to, while displaying the notification regarding the meal plan, display information on the meal plan in response to a user input through the display.

The refrigerator may further include a communication device. The controller may, in response to a user input through the display displaying the information on the meal plan, control the communication device to send a message requesting for preheating to a cooking device.

The controller may, in response to the current time being within a predetermined time range, control the display to display the notification regarding the meal plan.

The controller may, based on whether a user device is located within a predetermined area, send a message for displaying the notification regarding the meal plan to at least one of the user device and a display device.

The controller may send a message for displaying the notification regarding the meal plan to the display device based on the user device being located within the predetermined area and may send a message for displaying the notification regarding the meal plan to the user device based on the user device not being located within the predetermined area.

The controller may receive information on items bought by the user from a server device through the communication device and may, based on the information on the items and the image data, identify the foods stored in the storage compartment.

The controller may control the communication device to send information on the identified foods to the server device and may receive a meal plan based on the information on the identified foods from the server device through the communication device.

The controller may control the communication device to send user information based on a user input and the information on the identified foods to the server device and may receive a meal plan based on the user information and the information on the identified foods from the server device through the communication device.

The controller may control the communication device to send connection information indicating connection with the cooking device and the information on the identified foods to the server device and may receive a meal plan based on the connection information and the information on the identified foods from the server device through the communication device.

The controller may control the communication device to send the information on the identified foods to the server device, may receive a meal plan based on the information on the identified foods from the server device through the communication device, and may receive a list of items recommended to buy based on the meal plan from another server device through the communication device.

The controller may control the communication device to send the information on the identified foods to the server device, may receive a list of items recommended to buy based on the information on the identified foods from the other server device through the communication device, and may receive a meal plan based on the information on the identified foods and the list of the items from the server device through the communication device.

A refrigerator according to one embodiment may include: a storage compartment; a camera having a field of view facing the storage compartment; a display; and a controller. The controller may obtain image data of the storage compartment from the camera, identify foods stored in the storage compartment based on the image data, obtain a meal plan based on information on the identified foods, a recipe for the meal plan, and a recommendation of items to buy for the meal plan, and simultaneously display the meal plan, the recipe for the meal plan, and the recommendation of items to buy for the meal plan on a single screen of the display.

Meanwhile, the embodiments disclosed herein may be implemented in the form of recording media storing computer-executable instructions. The instructions may be stored in the form of program codes and may, when executed by a processor, generate a program module to perform operations of the disclosed embodiments. The recording media may be implemented as computer-readable recording media.

The computer-readable recording media include all kinds of recording media in which computer-readable instructions are stored. Examples of the computer-readable recording media may include a read-only memory (ROM), a random-access memory (RAM), a magnetic tape, a magnetic disk, a flash memory, an optical data storage device, and the like.

While the disclosure has been shown and described with reference to the various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
a storage compartment;
a camera having a field of view facing the storage compartment;
a display;
a range sensor;
memory, comprising one or more storage media, storing instructions; and
at least one processor communicatively coupled to the camera, the display, the range sensor and the memory
wherein the instructions, when executed by the at least one processor individually or collectively, cause the refrigerator to:
obtain image data of the storage compartment from the camera,
identify foods stored in the storage compartment based on the image data,
obtain a meal plan based on information on the identified foods,
control the display to display a pop-up window smaller than a size of the display including a notification regarding the meal plan, in response to a distance to a user being a predetermined reference distance or more based on an output of the range sensor, and
control the display to display a window frame substantially the same as the notification regarding the meal plan, in response to the distance to the user being less than the predetermined reference distance based on the output of the range sensor,
wherein a size of the window frame is larger than a size of the pop-up window.

2. The refrigerator of claim 1, wherein the instructions, when executed by the at least one processor individually or collectively, further cause the refrigerator to control the display to, while displaying the notification regarding the meal plan, display information on the meal plan in response to a user input through the display.

3. The refrigerator of claim 2, further comprising:
a communication device configured to communicate with a cooking device, wherein, in response to a user input through the display displaying the information on the meal plan, the instructions, when executed by the at least one processor individually or collectively, further cause the refrigerator to control the communication device to send a message requesting for preheating to the cooking device.

4. The refrigerator of claim 1, wherein, in response to a current time being within a predetermined time range, t the instructions, when executed by the at least one processor individually or collectively, further cause the refrigerator to control the display to display the notification regarding the meal plan.

5. The refrigerator of claim 1, further comprising:
a communication device configured to communicate with a user device and a display device,
wherein, based on whether the user device is located within a predetermined area, the instructions, when executed by the at least one processor individually or collectively, further cause the refrigerator to send a message for displaying the notification regarding the meal plan to at least one of the user device or the display device.

6. The refrigerator of claim 5,
wherein the instructions, when executed by the at least one processor individually or collectively, further cause the refrigerator to send a message for displaying the notification regarding the meal plan to the display device based on the user device being located within the predetermined area, and
wherein the instructions, when executed by the at least one processor individually or collectively, further cause the refrigerator to send a message for displaying the notification regarding the meal plan to the user device based on the user device not being located within the predetermined area.

7. The refrigerator of claim 1, further comprising:
a communication device configured to communicate with a server device,
wherein the instructions, when executed by the at least one processor individually or collectively, further cause the refrigerator to receive information on items bought by the user from the server device through the communication device, and
wherein the instructions, when executed by the at least one processor, based on the information on the items and the image data, further cause the refrigerator to identify the foods stored in the storage compartment.

8. The refrigerator of claim 1, further comprising:
a communication device configured to communicate with a server device,
wherein the instructions, when executed by the at least one processor individually or collectively, further cause the refrigerator to control the communication device to send information on the identified foods to the server device and receives a meal plan based on the information on the identified foods from the server device through the communication device.

9. The refrigerator of claim 1, further comprising:
a communication device configured to communicate with a server device,
wherein the instructions, when executed by the at least one processor individually or collectively, further cause the refrigerator to control the communication device to send user information based on a user input and the information on the identified foods to the server device, and wherein the instructions, when executed by the at least one processor individually or collectively, further cause the refrigerator to receive a meal plan based on the user information and the information on the identified foods from the server device through the communication device.

10. The refrigerator of claim 1, further comprising:
a communication device configured to communicate with a server device and a cooking device,
wherein the instructions, when executed by the at least one processor individually or collectively, further cause the refrigerator to control the communication device to send connection information indicating connection with the cooking device and the information on the identified foods to the server device, and
wherein the instructions, when executed by the at least one processor individually or collectively, further cause the refrigerator to receive a meal plan based on the connection information and the information on the identified foods from the server device through the communication device.

11. The refrigerator of claim 1, further comprising:
a communication device configured to communicate with a server device and another server device,
wherein the instructions, when executed by the at least one processor individually or collectively, further cause the refrigerator to:
control the communication device to send the information on the identified foods to the server device,
receive a list of items recommended to buy based on the information on the identified foods from the other server device through the communication device, and
receive a meal plan based on the information on the identified foods and the list of the items from the server device through the communication device.

12. The refrigerator of claim 1, further comprising:
a communication device configured to communicate with a server device and another server device,
wherein the instructions, when executed by the at least one processor individually or collectively, further cause the refrigerator to:
control the communication device to send the information on the identified foods to the server device,
receive a meal plan based on the information on the identified foods from the server device through the communication device, and
receive a list of items recommended to buy based on the meal plan from the other server device through the communication device.

13. A control method of a refrigerator including a storage compartment and a camera having a field of view facing the storage compartment, the control method comprising:
obtaining image data of the storage compartment from the camera;
identifying foods stored in the storage compartment based on the image data;
obtaining a meal plan based on information on the identified foods;
displaying a pop-up window smaller than a size of a display including a notification regarding the meal plan, in response to a distance to a user being a predetermined reference distance or more; and
displaying a window frame substantially the same as the notification regarding the meal plan, in response to the distance to the user being less than the predetermined reference distance, wherein a size of the window frame is larger than a size of the pop-up window.

14. The refrigerator of claim 1, wherein the window frame covers the pop-up window.

* * * * *